United States Patent
Kobayashi et al.

(10) Patent No.: US 6,192,018 B1
(45) Date of Patent: Feb. 20, 2001

(54) RECORDABLE DISC AND DEVICE FOR RECORDING DATA IN THE SAME DISC

(75) Inventors: Shoei Kobayashi, Kanagawa; Shozo Masuda, Tokyo, both of (JP)

(73) Assignee: Sony Corporation, Tokyo (JP)

( * ) Notice: Under 35 U.S.C. 154(b), the term of this patent shall be extended for 0 days.

(21) Appl. No.: 09/552,316

(22) Filed: Apr. 27, 2000

Related U.S. Application Data

(63) Continuation of application No. 08/951,850, filed on Oct. 16, 1997, now Pat. No. 6,067,281.

(30) Foreign Application Priority Data

Oct. 18, 1996 (JP) .................................................. 8-275998

(51) Int. Cl.$^7$ ...................................................... G11B 7/00
(52) U.S. Cl. ............................... 369/59; 369/47; 369/58; 369/275.3
(58) Field of Search .................................. 369/47, 48, 49, 369/50, 54, 58, 59, 32, 44.13, 44.28, 44.34, 275.1, 275.3, 275.4; 360/48, 49, 50, 51, 53, 39

(56) References Cited

U.S. PATENT DOCUMENTS 5,363,362 * 11/1994 Maeda et al. ........................ 369/54
5,388,105    2/1995 Takagi et al. ...................... 371/37.7
5,754,522    5/1998 Kobayashi et al. ............... 369/275.3
6,091,686 * 7/2000 Caffarelli et al. ...................... 369/58

FOREIGN PATENT DOCUMENTS

| 0 469 727 | 2/1992 | (EP) . |
| 0 613 136 | 8/1994 | (EP) . |
| 0 718 831 | 6/1996 | (EP) . |
| 0 790 613 | 8/1997 | (EP) . |
| 0 793 234 | 9/1997 | (EP) . |
| 0 800 172 | 10/1997 | (EP) . |
| 0 813 198 | 12/1997 | (EP) . |
| 0 893 794 | 1/1999 | (EP) . |
| 9-212871 | 8/1997 | (JP) . |
| WO 97/30439 | 8/1997 | (WO) . |

OTHER PUBLICATIONS

Patent Abstracts of Japan, vol. 016, No. 442 (P1421), Sep. 16, 1992 & JP 04 153919 A (Nippon Telegr & Teleph Corp.), May 27, 1992.

Patent Abstracts of Japan, vol. 013, No. 032 (P–817), Jan. 25, 1989 & JP 63 229625 A (Matsushita Electric Ind Co. Ltd), Sep. 26, 1988.

* cited by examiner

*Primary Examiner*—Muhammad Edun
(74) *Attorney, Agent, or Firm*—Frommer Lawrence & Haug, LLP.; William S. Frommer; Dexter T. Chang

(57) ABSTRACT

A cluster and a cluster are linked by a link frame. The link area includes postamble, post guard, and a slice/PLL area, as well as a link data area. Substantially the same data as that recorded in clusters is recorded in the link data area. The capacity of a rewritable disc can thus be increased.

11 Claims, 22 Drawing Sheets

WOBBLED DATA FRAME STRUCTURE

FIG. 12

ZCLD format

| zone NO. | r(μm) | frame/trk | trk/zone | EBLK/zone | bit min (μm/b) | cap(byte) | rotation (rpm) | vel.min. (m/s) | vel.max. (m/s) |
|---|---|---|---|---|---|---|---|---|---|
| 0 | 24000.0 | 632 | 442 | 632 | 0.32 | 20709376 | 1774 | 4.46 | 4.53 |
| 1 | 24366.9 | 640 | 442 | 640 | 0.32 | 20971520 | 1774 | 4.53 | 4.59 |
| 2 | 24733.7 | 648 | 442 | 648 | 0.32 | 21233664 | 1774 | 4.59 | 4.66 |
| 3 | 25100.6 | 656 | 442 | 656 | 0.32 | 21495808 | 1774 | 4.66 | 4.73 |
| 4 | 25467.4 | 664 | 442 | 664 | 0.32 | 21757952 | 1774 | 4.73 | 4.80 |
| 5 | 25834.3 | 672 | 442 | 672 | 0.32 | 22020096 | 1774 | 4.80 | 4.87 |
| 6 | 26201.2 | 680 | 442 | 680 | 0.32 | 22282240 | 1774 | 4.87 | 4.93 |
| 7 | 26568.0 | 688 | 442 | 688 | 0.33 | 22544384 | 1774 | 4.93 | 5.00 |
| 8 | 26934.9 | 696 | 442 | 696 | 0.33 | 22806528 | 1774 | 5.00 | 5.07 |
| 9 | 27301.7 | 704 | 442 | 704 | 0.33 | 23068672 | 1774 | 5.07 | 5.14 |
| 10 | 27668.6 | 712 | 442 | 712 | 0.33 | 23330816 | 1774 | 5.14 | 5.21 |
| 11 | 28035.5 | 720 | 442 | 720 | 0.33 | 23592960 | 1774 | 5.21 | 5.28 |
| 12 | 28402.3 | 728 | 442 | 728 | 0.33 | 23855104 | 1774 | 5.28 | 5.34 |
| 13 | 28769.2 | 736 | 442 | 736 | 0.33 | 24117248 | 1774 | 6.28 | 5.41 |
| 14 | 29136.0 | 744 | 442 | 744 | 0.33 | 24379392 | 1774 | 5.34 | 5.48 |
| 15 | 29502.9 | 752 | 442 | 752 | 0.33 | 24641536 | 1774 | 5.41 | 5.55 |
| 16 | 29869.8 | 760 | 442 | 760 | 0.33 | 24903680 | 1774 | 5.48 | 5.62 |
| 17 | 30236.6 | 768 | 442 | 768 | 0.33 | 25165824 | 1774 | 5.55 | 5.68 |
| 18 | 30603.5 | 776 | 442 | 776 | 0.33 | 25427968 | 1774 | 5.62 | 5.75 |
| 19 | 30970.3 | 784 | 442 | 784 | 0.33 | 25690112 | 1774 | 5.68 | 5.82 |
| 20 | 31337.2 | 792 | 442 | 792 | 0.33 | 25952256 | 1774 | 5.75 | 5.89 |
| 21 | 31704.1 | 800 | 442 | 800 | 0.33 | 26214400 | 1774 | 5.82 | 5.96 |
| 22 | 32070.9 | 808 | 442 | 808 | 0.34 | 26476544 | 1774 | 5.89 | 6.02 |
| 23 | 32437.8 | 816 | 442 | 816 | 0.34 | 26738688 | 1774 | 5.96 | 6.09 |

FIG. 13

ZCLD format

| zone NO. | r(μm) | frame/trk | trk/zone | EBLK/zone | bit min (μm/b) | cap(byte) | rotation l (rpm) | vel.min l (m/s) | vel.max.l (m/s) |
|---|---|---|---|---|---|---|---|---|---|
| 24 | 32804.6 | 824 | 442 | 824 | 0.34 | 27000832 | 1774 | 6.09 | 6.16 |
| 25 | 33171.5 | 832 | 442 | 832 | 0.34 | 27262976 | 1774 | 6.16 | 6.23 |
| 26 | 33538.4 | 840 | 442 | 840 | 0.34 | 27525120 | 1774 | 6.23 | 6.30 |
| 27 | 33905.2 | 848 | 442 | 848 | 0.34 | 27787264 | 1774 | 6.30 | 6.37 |
| 28 | 34272.1 | 856 | 442 | 856 | 0.34 | 28049408 | 1774 | 6.37 | 6.43 |
| 29 | 34638.9 | 864 | 442 | 864 | 0.34 | 28311552 | 1774 | 6.43 | 6.50 |
| 30 | 35005.8 | 872 | 442 | 872 | 0.34 | 28573696 | 1774 | 6.50 | 6.57 |
| 31 | 35372.7 | 880 | 442 | 880 | 0.34 | 28835840 | 1774 | 6.57 | 6.64 |
| 32 | 35739.5 | 888 | 442 | 888 | 0.34 | 29097984 | 1774 | 6.64 | 6.71 |
| 33 | 36106.4 | 896 | 442 | 896 | 0.34 | 29360128 | 1774 | 6.71 | 6.77 |
| 34 | 36473.2 | 904 | 442 | 904 | 0.34 | 29622272 | 1774 | 6.77 | 6.84 |
| 35 | 36840.1 | 912 | 442 | 912 | 0.34 | 29884416 | 1774 | 6.84 | 6.91 |
| 36 | 37207.0 | 920 | 442 | 920 | 0.34 | 30146560 | 1774 | 6.91 | 6.98 |
| 37 | 37573.8 | 928 | 442 | 928 | 0.34 | 30408704 | 1774 | 6.98 | 7.05 |
| 38 | 37940.7 | 936 | 442 | 936 | 0.34 | 30670848 | 1774 | 7.05 | 7.11 |
| 39 | 38307.5 | 944 | 442 | 944 | 0.34 | 30932992 | 1774 | 7.11 | 7.18 |
| 40 | 38674.4 | 952 | 442 | 952 | 0.34 | 31195136 | 1774 | 7.18 | 7.25 |
| 41 | 39041.3 | 960 | 442 | 960 | 0.34 | 31457280 | 1774 | 7.25 | 7.32 |
| 42 | 39408.1 | 968 | 442 | 968 | 0.34 | 31719424 | 1774 | 7.32 | 7.39 |
| 43 | 39775.0 | 976 | 442 | 976 | 0.34 | 31981568 | 1774 | 7.39 | 7.46 |
| 44 | 40141.8 | 984 | 442 | 984 | 0.34 | 32243712 | 1774 | 7.46 | 7.52 |
| 45 | 40508.7 | 992 | 442 | 992 | 0.34 | 32505856 | 1774 | 7.52 | 7.59 |
| 46 | 40875.6 | 1000 | 442 | 1000 | 0.35 | 32768000 | 1774 | 7.59 | 7.66 |
| 47 | 41242.4 | 1008 | 442 | 1008 | 0.35 | 33030144 | 1774 | 7.66 | 7.73 |

FIG. 14

ZCLD format

| zone NO. | r(μm) | frame/trk | trk/zone | EBLK/zone | bit min (μm/b) | cap(byte) | rotation (rpm) | vel.min (m/s) | vel.max (m/s) |
|---|---|---|---|---|---|---|---|---|---|
| 48 | 416093 | 1016 | 442 | 1016 | 0.35 | 332922288 | 1774 | 7.73 | 7.80 |
| 49 | 419761 | 1024 | 442 | 1024 | 0.35 | 335544432 | 1774 | 7.80 | 7.86 |
| 50 | 423430 | 1032 | 442 | 1032 | 0.35 | 338166576 | 1774 | 7.86 | 7.93 |
| 51 | 427099 | 1040 | 442 | 1040 | 0.35 | 340788720 | 1774 | 7.93 | 8.00 |
| 52 | 430767 | 1048 | 442 | 1048 | 0.35 | 343403864 | 1774 | 8.00 | 8.07 |
| 53 | 434436 | 1056 | 442 | 1056 | 0.35 | 346033008 | 1774 | 8.07 | 8.14 |
| 54 | 438104 | 1064 | 442 | 1064 | 0.35 | 348655152 | 1774 | 8.14 | 8.21 |
| 55 | 441773 | 1072 | 442 | 1072 | 0.35 | 351277296 | 1774 | 8.21 | 8.27 |
| 56 | 445442 | 1080 | 442 | 1080 | 0.35 | 353899440 | 1774 | 8.27 | 8.34 |
| 57 | 449110 | 1088 | 442 | 1088 | 0.35 | 356515184 | 1774 | 8.34 | 8.41 |
| 58 | 452779 | 1096 | 442 | 1096 | 0.35 | 359137728 | 1774 | 8.41 | 8.48 |
| 59 | 456447 | 1104 | 442 | 1104 | 0.35 | 361757872 | 1774 | 8.48 | 8.55 |
| 60 | 460116 | 1112 | 442 | 1112 | 0.35 | 364380016 | 1774 | 8.55 | 8.61 |
| 61 | 463785 | 1120 | 442 | 1120 | 0.35 | 367001160 | 1774 | 8.61 | 8.68 |
| 62 | 467453 | 1128 | 442 | 1128 | 0.35 | 369623304 | 1774 | 8.68 | 8.75 |
| 63 | 471122 | 1136 | 442 | 1136 | 0.35 | 372244448 | 1774 | 8.75 | 8.82 |
| 64 | 474790 | 1144 | 442 | 1144 | 0.35 | 374865592 | 1774 | 8.82 | 8.89 |
| 65 | 478459 | 1152 | 442 | 1152 | 0.35 | 377487736 | 1774 | 8.89 | 8.95 |
| 66 | 482128 | 1160 | 442 | 1160 | 0.35 | 380108880 | 1774 | 8.95 | 9.02 |
| 67 | 485796 | 1168 | 442 | 1168 | 0.35 | 382731024 | 1774 | 9.02 | 9.09 |
| 68 | 489465 | 1176 | 442 | 1176 | 0.35 | 385353168 | 1774 | 9.09 | 9.16 |
| 69 | 493133 | 1184 | 442 | 1184 | 0.35 | 387975312 | 1774 | 9.16 | 9.23 |
| 70 | 496802 | 1192 | 442 | 1192 | 0.35 | 390594456 | 1774 | 9.23 | 9.30 |
| 71 | 500471 | 1200 | 442 | 1200 | 0.35 | 393216600 | 1774 | 9.30 | 9.36 |

FIG. 15

ZCLD format

| zone NO. | r (μm) | frame/trk | trk/zone | EBLK/zone | bit min (μm/b) | cap(byte) | rotation1 (rpm) | vel.min1 (m/s) | vel.max1 (m/s) |
|---|---|---|---|---|---|---|---|---|---|
| 72 | 50413.9 | 1208 | 442 | 1208 | 0.35 | 39583744 | 1774 | 9.36 | 9.43 |
| 73 | 50780.8 | 1216 | 442 | 1216 | 0.35 | 39845888 | 1774 | 9.43 | 9.50 |
| 74 | 51147.6 | 1224 | 442 | 1224 | 0.35 | 40108032 | 1774 | 9.50 | 9.57 |
| 75 | 51514.5 | 1232 | 442 | 1232 | 0.35 | 40370176 | 1774 | 9.57 | 9.64 |
| 76 | 51881.4 | 1240 | 442 | 1240 | 0.35 | 40632320 | 1774 | 9.64 | 9.70 |
| 77 | 52248.2 | 1248 | 442 | 1248 | 0.35 | 40894464 | 1774 | 9.70 | 9.77 |
| 78 | 52615.1 | 1256 | 442 | 1256 | 0.35 | 41156608 | 1774 | 9.77 | 9.84 |
| 79 | 52981.9 | 1264 | 442 | 1264 | 0.35 | 41418752 | 1774 | 9.84 | 9.91 |
| 80 | 53348.8 | 1272 | 442 | 1272 | 0.35 | 41680896 | 1774 | 9.91 | 9.98 |
| 81 | 53715.7 | 1280 | 442 | 1280 | 0.35 | 41943040 | 1774 | 9.98 | 10.04 |
| 82 | 54082.5 | 1288 | 442 | 1288 | 0.35 | 42205184 | 1774 | 10.04 | 10.11 |
| 83 | 54449.4 | 1296 | 442 | 1296 | 0.35 | 42467328 | 1774 | 10.11 | 10.18 |
| 84 | 54816.2 | 1304 | 442 | 1304 | 0.35 | 42729472 | 1774 | 10.18 | 10.25 |
| 85 | 55183.1 | 1312 | 442 | 1312 | 0.36 | 42991616 | 1774 | 10.25 | 10.32 |
| 86 | 55550.0 | 1320 | 442 | 1320 | 0.36 | 43253760 | 1774 | 10.32 | 10.39 |
| 87 | 55916.8 | 1328 | 442 | 1328 | 0.36 | 43515904 | 1774 | 10.39 | 10.45 |
| 88 | 56283.7 | 1336 | 442 | 1336 | 0.36 | 43778048 | 1774 | 10.45 | 10.52 |
| 89 | 56650.5 | 1344 | 442 | 1344 | 0.36 | 44040192 | 1774 | 10.52 | 10.59 |
| 90 | 57017.4 | 1352 | 442 | 1352 | 0.36 | 44302336 | 1774 | 10.59 | 10.66 |
| 91 | 57384.3 | 1360 | 442 | 1360 | 0.36 | 44564480 | 1774 | 10.66 | 10.73 |
|   | 57751.1 |   | 40664 | 91632 |   | 3002597376 |   |   |   |

Track pitch (μm)  0.83

F I G. 19
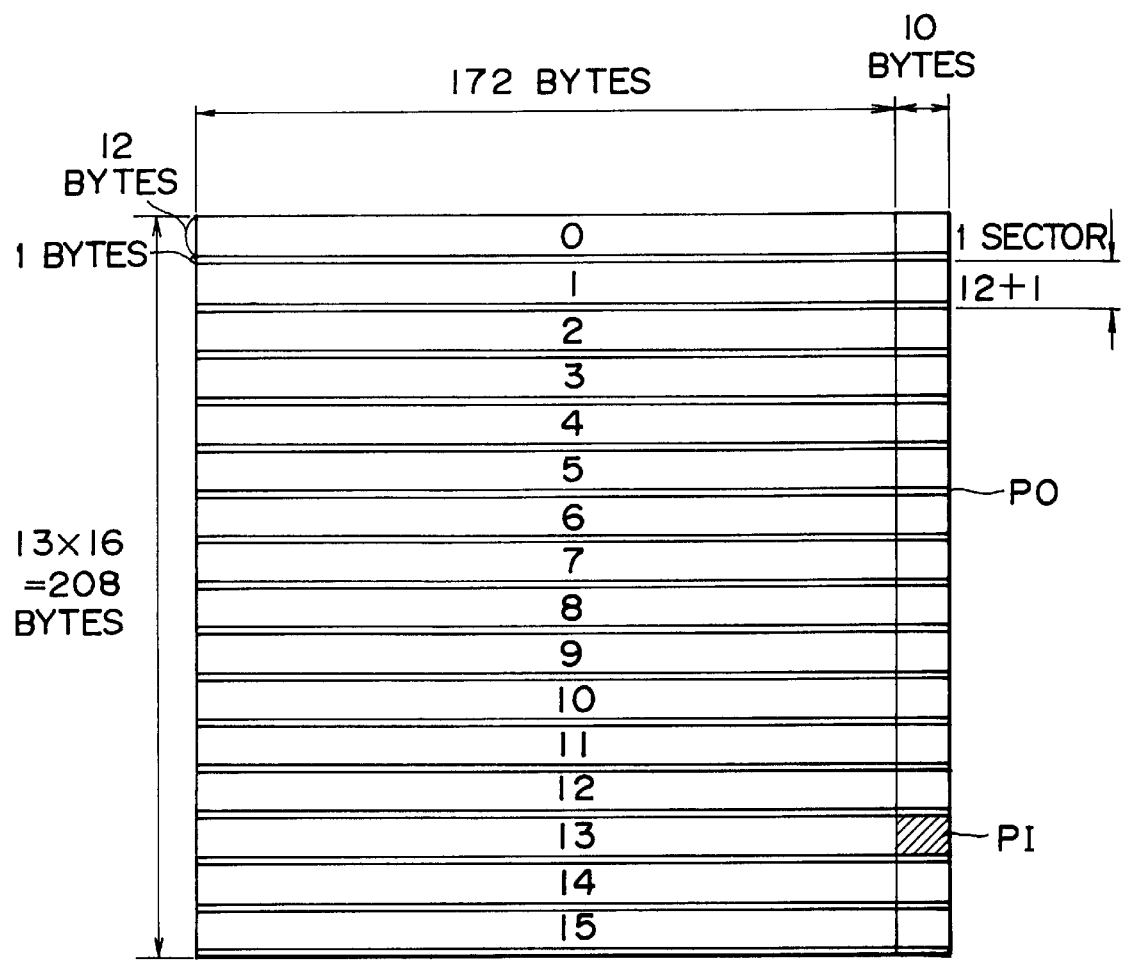

FIG. 21

ROM

| 1 FRAME 93B | | 1 FRAME 93B | |
|---|---|---|---|
| SY0 | | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |
| SY0 | | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

1 SECTOR (13 ROWS = 26 FRAMES)
1 SECTOR (13 ROWS = 26 FRAMES)

FIG. 24

State 1 and 2

|  | (MSB) | (LSB) | (MSB) | (LSB) |
|---|---|---|---|---|
| SY0 = | 000100100100 | 00000000000010001 | 00011001001000000100 | 00000000000001001 |
| SY1 = | 000001000000100 | 00000000000010001 | 0000100010000010000100 | 00000000000001001 |
| SY2 = | 000100000000100 | 00000000000010001 | 0001001000000001000100 | 00000000000001001 |
| SY3 = | 000010000000100 | 00000000000010001 | 000010000010000100 | 00000000000001001 |
| SY4 = | 001000000000100 | 00000000000010001 | 00100100010010001001000 | 00000000000001001 |
| SY5 = | 001001000100 | 00000000000010001 | 00100100010000000100 | 00000000000001001 |
| SY6 = | 001001001000100 | 00000000000010001 | 001000001000000100 | 00000000000001001 |
| SY7 = | 001001001000100 | 00000000000010001 | 001001001000010000100 | 00000000000001001 |

State 3 and 4

|  | (MSB) | (LSB) | (MSB) | (LSB) |
|---|---|---|---|---|
| SY0 = | 1001001000000100 | 00000000000010001 | 100100100100100 | 00000000000001001 |
| SY1 = | 1000010001000100 | 00000000000010001 | 1000010000010000100 | 00000000000001001 |
| SY2 = | 1001000001000100 | 00000000000010001 | 1001000000010000100 | 00000000000001001 |
| SY3 = | 1000001001001000100 | 00000000000010001 | 1000000100000100 | 00000000000001001 |
| SY4 = | 1000100010000100 | 00000000000010001 | 1000100010000100 | 00000000000001001 |
| SY5 = | 1000100010000100 | 00000000000010001 | 100000010000100 | 00000000000001001 |
| SY6 = | 1001000010000100 | 00000000000010001 | 100000000100000100 | 00000000000001001 |
| SY7 = | 1000100010000100 | 00000000000010001 | 1000000001000000100 | 00000000000001001 |

RECORDABLE DISC AND DEVICE FOR RECORDING DATA IN THE SAME DISC

This application is a continuation of Ser. No. 08/951,850 filed Oct. 16, 1997, now U.S. Pat. No. 6,067,281.

BACKGROUND OF THE INVENTION

1. Field of the Invention

This invention relates to a recording/reproducing device and method and discs applied therein, and more particularly to a recording/reproducing device and method and discs applied therein for recording data on a rewritable disc in higher density or reproducing data therefrom.

2. Description of the Prior Art

As the method for addressing an optical disc (RAM disc) from and onto which data can be reproduced and rewritten, it is well known in CDR (Compact Disc Recordable), for example, that guide grooves (groove tracks) for recording or reproducing data are wobbled according to address information. The method of recording addresses by wobbling has the merit of improving redundancy, compared with the method of recording addresses in advance as pre-pits by embossing or the like. Without the need to produce pre-pits by embossing, this method also has the advantage of providing compatibility with reproduction only ROM discs recorded in the form of CLV.

In a rewritable disc on which data is not always recorded continuously, a link area must be formed between a cluster and a cluster, wherein the link area must not only include a PLL area where clocks for data recording/reproducing are recorded and a slice control area where data for controlling a slice level for transforming a reproduction RF signal into a binary value is recorded, but also contain frame synchronizing signals for providing frame synchronization.

However, since no substantial data is recorded in each frame of the link area, there has been the problem that the capacity of conventional rewritable discs cannot be increased, compared with ROM discs.

SUMMARY OF THE INVENTION

This invention has been made in consideration of the above situation and its object is to permit the recording of data in higher density.

A rewritable disc in which data is recorded along tracks, the disc comprising: a plurality of data blocks of second size, a plurality of collected sector data of first size being formed on said tracks; and link area of said first size, formed between respective data blocks and subsequent data blocks.

A disc according to claim 1, wherein the second size is a unit for recording or reproducing data.

A disc according to claim 1, wherein the data blocks have first and second error correction blocks comprised of first and second error correction code types.

A disc according to claim 1, wherein the link area includes a start point for use as a recording start position and position shift data recorded from the start point and having a specified data amount selected as a random value.

A disc according to claim 1, wherein the track is comprised of wobbling groove modulated corresponding to address information including a track number and a segment number designating a circumferential direction.

A disc according to claim 1, wherein each of the sector data comprises a plurality of frame data having frame synchronization signals which are selected from among frame synchronization signals of plural types and are disposed in specified order, and said link area includes frame data disposed in such order that the frame synchronization signals are equal to the sector data.

A rewritable disc in which data is recorded along tracks, wherein the disc has the same frame structure as a reproduce only disc in which sector data comprised of a plurality of frame data having respective specified frame synchronization signals, and a link area is formed between the sector data and subsequent sector data and includes frame data disposed in such order that the frame synchronization signals are equal to said sector data.

A device for recording data in a rewritable disc, the device comprising: a head for recording data on tracks formed in the disc and reproducing the data recorded on the tracks; and a recording circuit for outputting input data to said head in units of data blocks having a first size and adding link areas having a second size before and after the data blocks for output.

A device according to claim 8, wherein the data block consists of a plurality of sectors having the second size, further comprising an address generation circuit for generating sector addresses to be added to these sectors.

A device according to claim 8, wherein the link areas comprise a front link area added after the preceding data block and a rear link area added to the following data block.

A device according to claim 8, wherein said recording circuit adds first and second error correction codes comprised of first and second error correction code types to the data blocks.

BRIEF DESCRIPTION OF THE DRAWINGS

FIG. 12 shows parameters of each zone.

FIG. 13 shows parameters of each zone.

FIG. 14 shows parameters of each zone.

FIG. 15 shows parameters of each zone.

FIG. 19 shows the state in which the outside code of FIG. 18 is interleaved.

FIG. 21 shows an example of the configuration of frames and frame synchronizing signals of a ROM disc.

FIG. 24 shows an example of frame synchronizing signals shown in FIGS. 21 and 22.

DESCRIPTION OF THE PREFERRED EMBODIMENTS

Figure 1A:
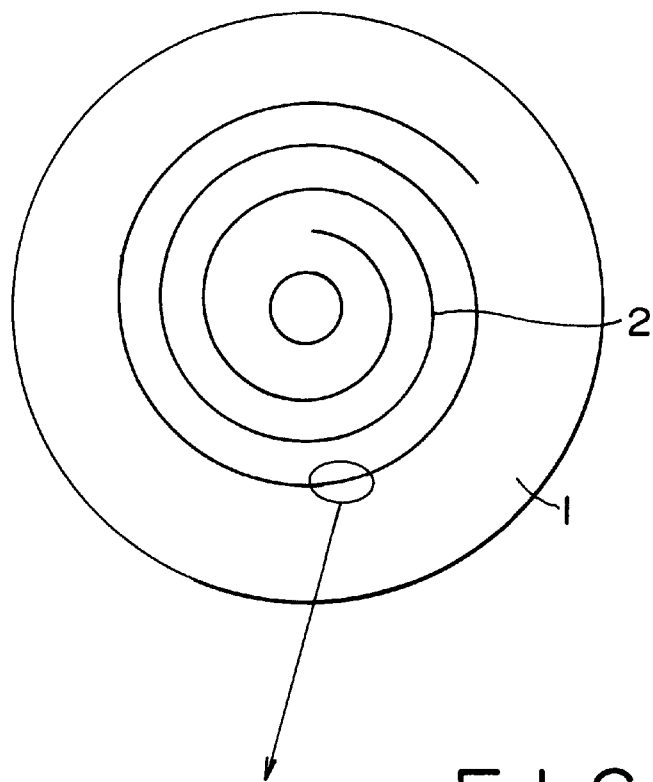
FIGS. 1A and 1B show the state in which a disc of this invention is wobbled.

FIG. 1A shows an example of the structure of an optical disc embodying a disc of the present invention. As shown in the figure, a pre-groove 2 is spirally formed in advance from inner circumferences toward outer circumferences. Of course, the pre-groove 2 can also be concentrically formed.

Figure 1B:
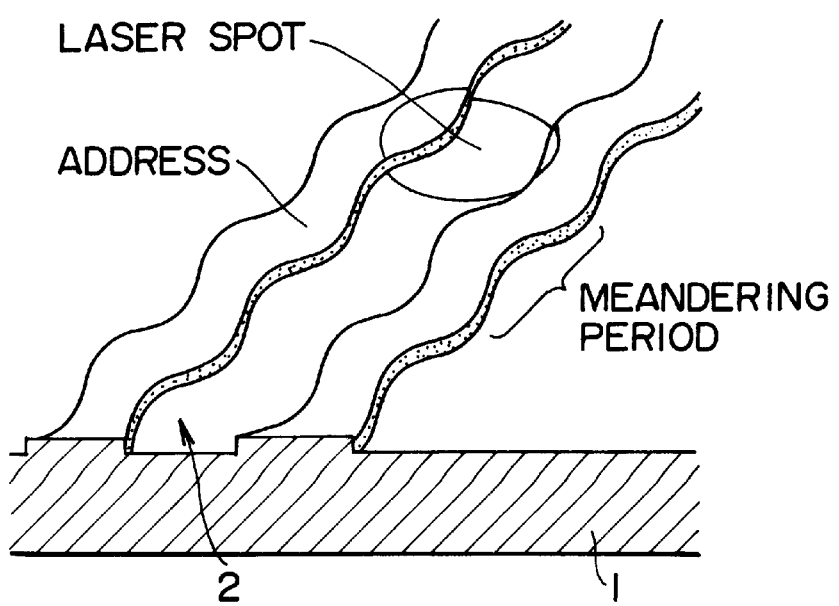

The pre-groove 2, as seen from a magnified portion thereof in FIG. 1B, has the walls at both sides which are wobbled according to address information and meander according to a frequency modulated wave. One track has a plurality of wobbling address frames.

Figure 2:
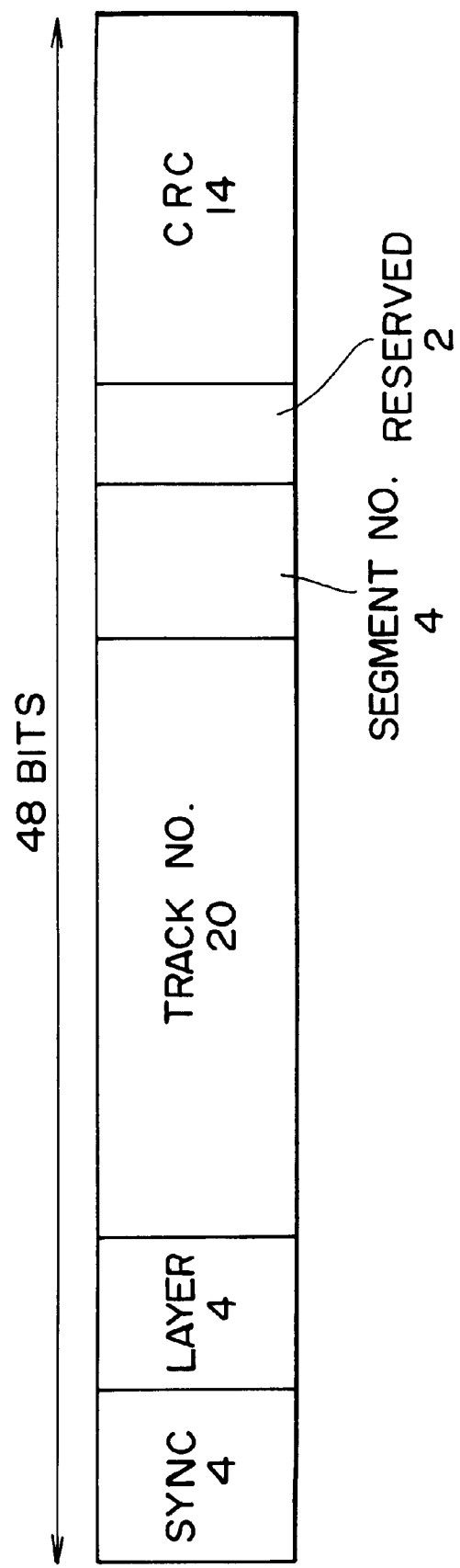
FIG. 2 shows an example of the structure of a wobbling address frame.

FIG. 2 shows the structure (format) of a wobbling address frame. As shown in the figure, a wobbling address frame is comprised of 48 bits, the first 4 bits of which indicate a synchronizing signal (Sync) designating the start of the wobbling address frame. The next 4 bits contains a segment number which indicates the circumferential direction of the disc. The next 20 bits contain a track address (track number). The next 4 bits contain the frame number of the address frame. The next 2 bits are reserved for future use. The subsequent 14 bits contain an error detection code (CRC), which is produced from data except a synchronizing signal (Sync).

Eight wobbling address frames, e.g., per track (one rotation) are recorded on a CAV (constant angular velocity) disc. Accordingly, a value from 0 to 7, e.g., is recorded in the segment number field shown in FIG. 2.

Figure 3:
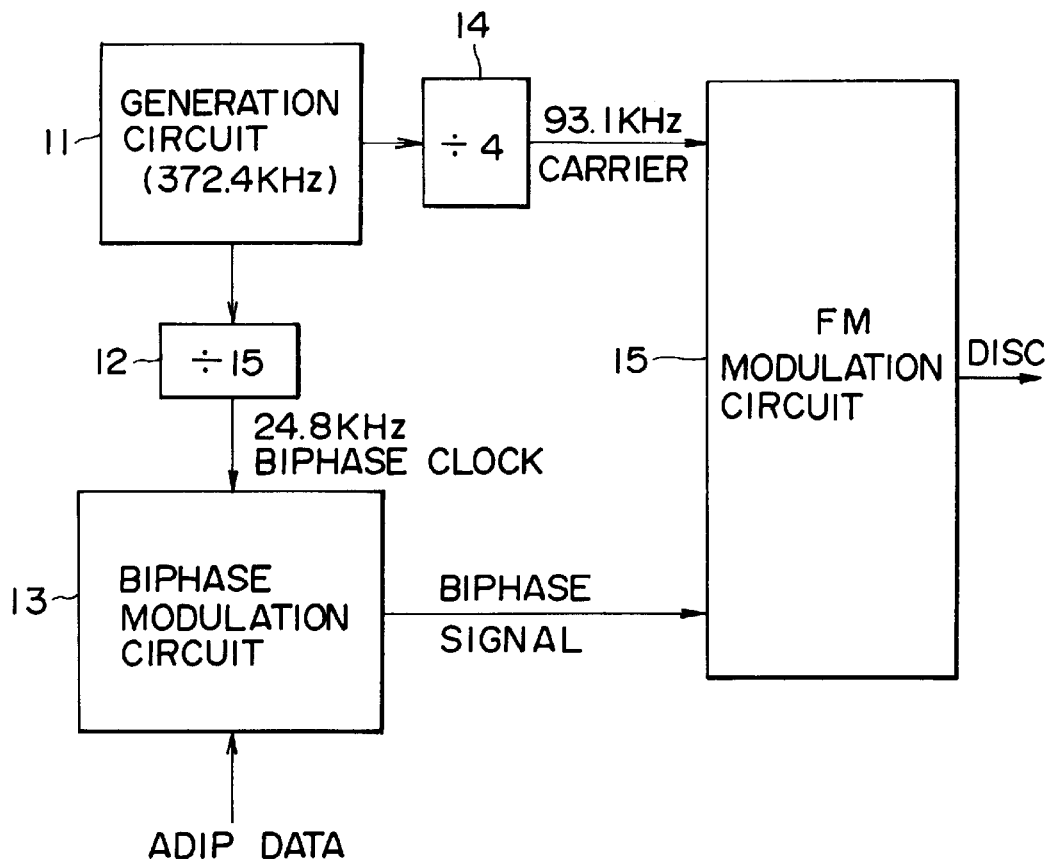
FIG. 3 shows an example of the configuration of a wobbling signal generation circuit.

FIG. 3 shows an example of the configuration of a wobbling signal generation circuit for generating a wobbling signal to wobble a pre-groove 2 according to an address of the format shown in FIG. 2. A generation circuit 11 generates a signal having a frequency of 372.4 kHz. A signal generated by the generation circuit 11 is fed to a divider 12, divided by a value 15, then fed to a biphase modulation circuit 13 as a biphase clock signal having a frequency of 24.8 kHz. The biphase modulation circuit 13 is also fed with ADIP (Address In Pre-groove) data of the frame format shown in FIG. 2.

The biphase modulation circuit 13 biphase-modulates the biphase clock fed from the divider 12 with ADIP data (address data) fed from a circuit not shown in the figure and feeds a biphase signal to an FM modulation circuit 15. The FM modulation circuit 15 is also fed with a carrier having a frequency of 93.1 kHz resulting from the division of a 372.4 kHz signal generated by the generation circuit 11 by a value 4 in the divisor 14. The FM modulation circuit 15 frequency-modulates the carrier input from the divider 14 with the biphase signal input from the biphase modulation circuit 13 and outputs a resulting frequency modulated signal. The walls at both sides of the pre-groove 2 on the disc 1 are formed (wobbling) according to the frequency modulated signal.

Figure 4:
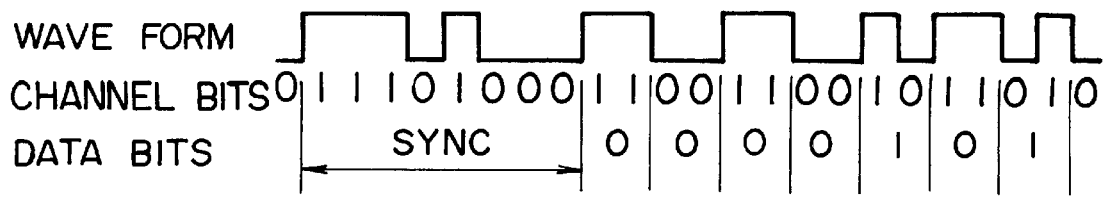
FIG. 4 shows an example of a biphase signal output by the biphase modulation circuit 13 of FIG. 3.
Figure 5:
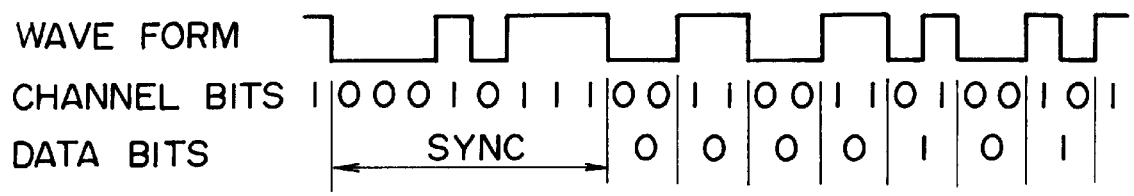
FIG. 5 shows another example of a biphase signal output by the biphase modulation circuit 13 of FIG. 3.

FIGS. 4 and 5 show examples of a biphase signal output from the biphase modulation circuit 13. In this embodiment, when a leading bit is 0, "11101000" is used as a synchronization pattern (SYNC) as shown in FIG. 4, and when a leading bit is 1, "00010111" is used as a synchronization pattern as shown in FIG. 5, indicating the opposite phase of the synchronization pattern shown in FIG. 4. SYNC is an irregular, unique pattern which will not appear in modulation.

"0" of data bits of address data (ADIP data) is biphase-modulated and converted to channel bits of "11" (when a preceding channel bit is 0) or "00" (when a preceding channel bit is 1). "1" is converted to channel bits of "10" (when a preceding channel bit is 0) or "01" (when a preceding channel bit is 1). Which of two patterns is selected for conversion depends on a preceding code. Namely, the wave forms in FIGS. 4 and 5 are represented by patterns of channel bits 1 and 0 with 1 as a high-level signal and 0 as a low-level signal, and one of two patterns is selected so that the wave forms are continuous.

Figure 6:
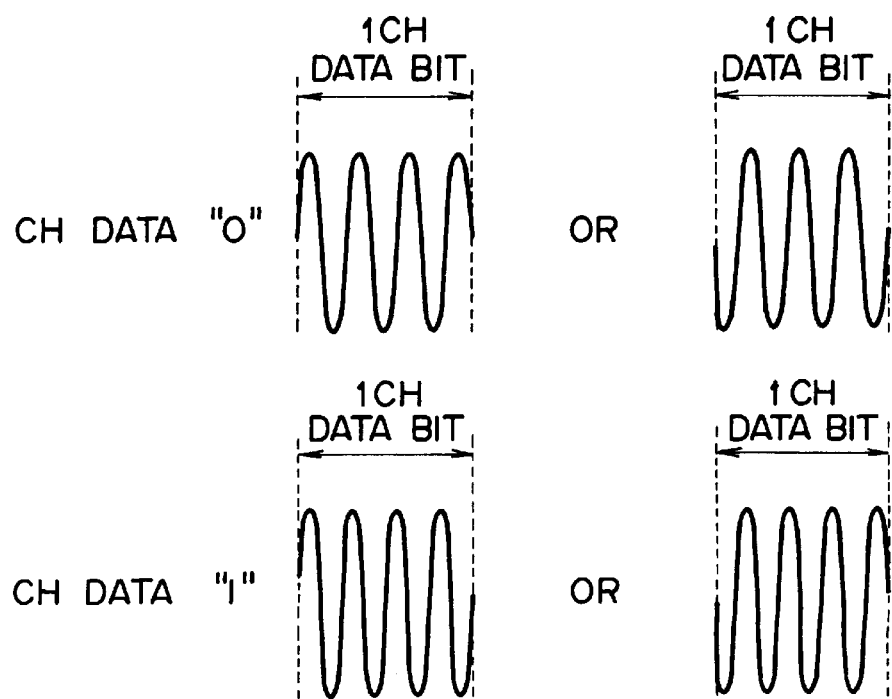
FIG. 6 shows frequency modulation performed by the FM modulation circuit 15 of FIG. 3.

According to a biphase signal shown in FIGS. 4 or 5, the FM modulation circuit 15 frequency-modulates a carrier fed from the divider 14 as shown in FIG. 6.

Namely, when channel bit data (biphase signal) is 0, the FM modulation circuit 15 outputs a 3.5-wave carrier in a period corresponding to half of the length of one data bit. The 3.5-wave carrier begins with a positive or negative half wave.

On the other hand, when channel bit data (biphase signal) is 1, a 4-wave carrier is output in a period corresponding to half of the length of one data bit. The 4-wave carrier also begins with a positive or negative half wave.

Accordingly, when channel data bits 00 are input correspondingly to data 0, the FM modulation circuit 15 outputs a 7-wave (=3.5+3.5) frequency modulated wave in a period corresponding to the length of the data bits, and when channel data bits 11 are input, the FM modulation circuit outputs an 8-wave (=4+4) frequency modulated wave. When channel data bits 10 or 01 are input correspondingly to data 1, a 7.5-wave (=4+3.5=3.5+4) frequency modulated wave is output.

A 93.1 kHz carrier input to the FM modulation circuit 15 corresponds to a 7.5-wave carrier, and according to data, the FM modulation circuit 15 produces the 7.5-wave carrier or a 7-wave or 8-wave frequency modulated wave shifted by ±6.67% (=0.5/7.5) with respect to the carrier.

As described above, as a carrier beginning with a positive half wave and a carrier beginning with a negative half wave which correspond to channel data 0 and channel data 1, respectively, the one continuous to a preceding signal is selected.

Figure 7:
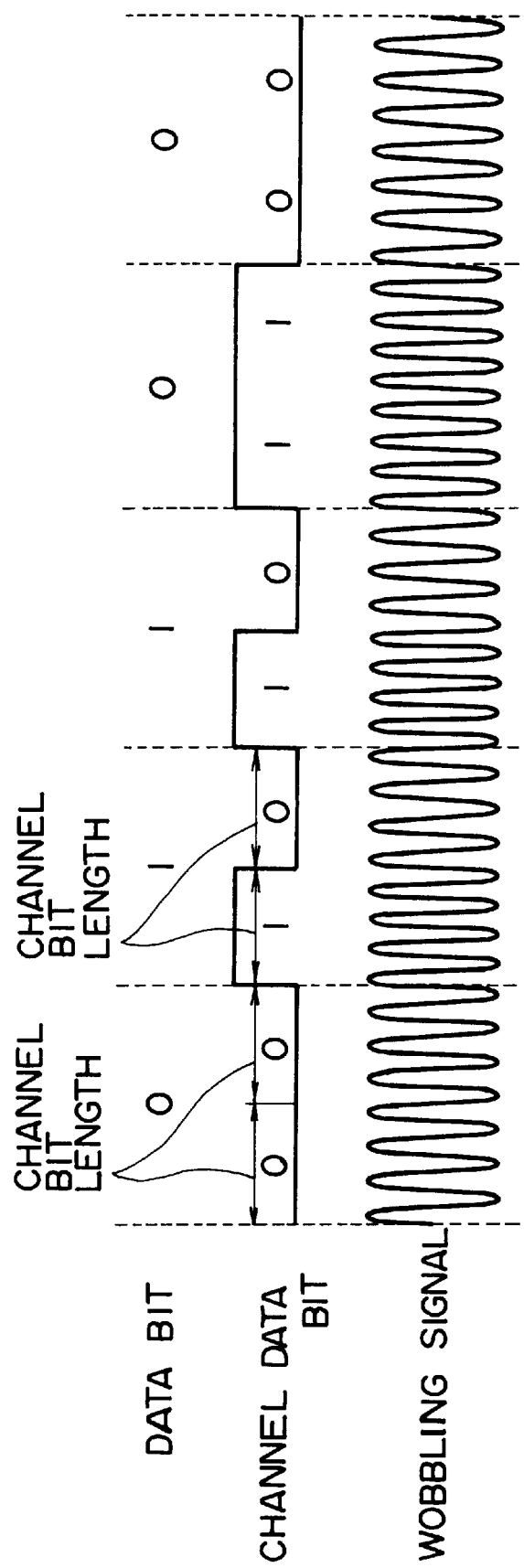
FIG. 7 shows a frequency modulated wave output by the FM modulation circuit of FIG. 3.

FIG. 7 shows an example of a frequency modulated wave output from the FM modulation circuit 15 in this way. In this example, the first data bit is 0 and the channel data bit thereof is 00. A 3.5-wave carrier beginning with a positive half wave at a start point is selected for the first channel data bit 0. As a result, the carrier ends with a positive half wave. Accordingly, a 3.5-wave carrier beginning with a negative half wave is selected for the next channel data bit 0, so that a frequency modulated wave having a total of 7 waves is produced for a data bit 0.

The data bit 0 is followed by a data bit 1 (channel bits 10). Because the 3.5-wave carrier for the channel data bit 0 corresponding to the preceding data bit 0 ends with a negative half wave, a carrier beginning with a positive half wave is selected as a 4-wave carrier for the first channel data bit 1 corresponding to the data bit 1. Because the 4-wave carrier for the channel data bit 1 ends with a negative half wave, a carrier beginning with a positive half wave is selected as a 4-wave carrier for the next channel data bit 0.

Hereinafter, in the same way, 7.5-wave, 8-wave, and 7-wave carriers are produced correspondingly to a data bit 1 (channel data bits 10), a data bit 0 (channel data bits 11), and a data bit 0 (channel data bits 00) so that they are continuous at the boundary points (start and end points) of data bits.

As shown in FIG. 7, in this embodiment, the length of channel bits is an integer multiple of the half of the wavelength of carrier in any case of a 7-wave, 7.5-wave, or 8-wave carrier. Namely, the length of channel bits is 7 times the half of the wavelength of a 7-wave carrier (frequency modulated wave) and 8 times the half of the wavelength of a 8-wave carrier (frequency modulated wave). The length of channel bits is 7 times (when a channel bit is 0) or 8 times (when a channel bit is 1) the half of the wavelength of a 7.5-wave carrier.

Further, in this embodiment, the boundary point (start or end point) of biphase-modulated channel bit is defined as a zero-cross point of frequency modulated wave. This equates the phases of address data (channel bit data) and frequency modulated wave, eases the identification of the boundary point of the bit, and helps to prevent erroneous detection of address data bits, resulting in accurate reproduction of address information.

In this embodiment, the boundary points (start and end points) of data bit and the edge (zero-cross point) of frequency modulated wave are made to correspond. This enables a clock to be produced on the basis of the edge of frequency modulated wave. In this embodiment, however, as described later with reference to FIG. 9, a clock is produced on the basis of a clock synchronizing mark.

Figure 8:
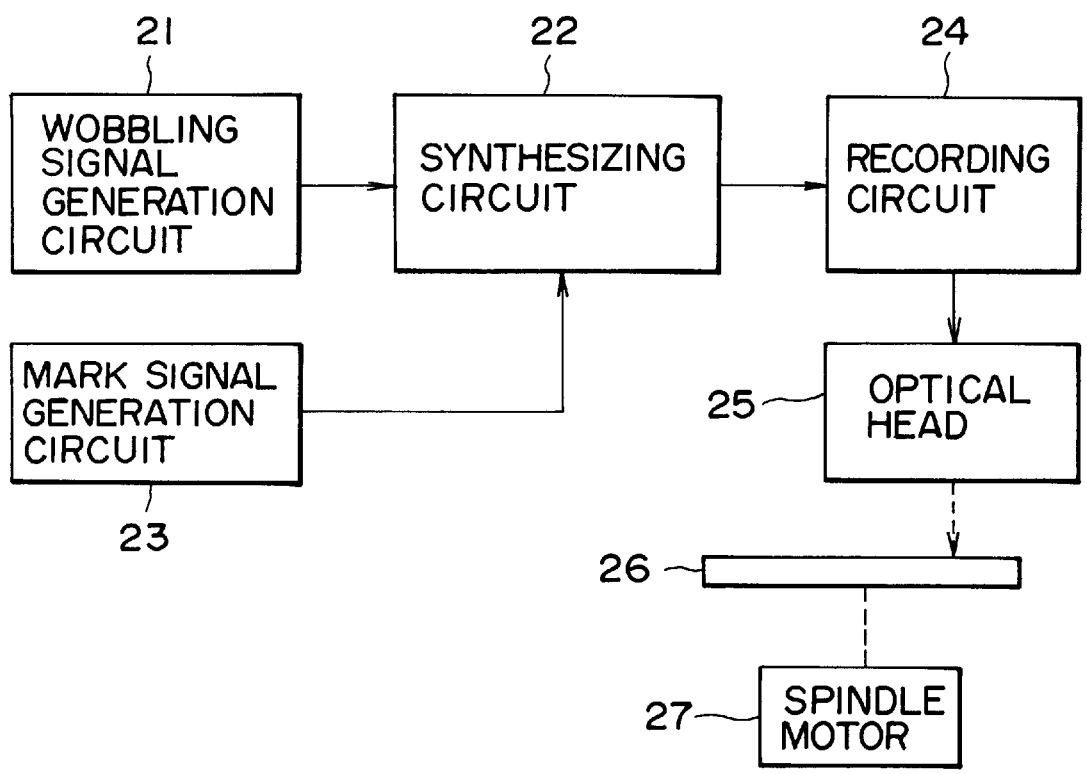
FIG. 8 shows an example of the configuration of a recording device for manufacturing a disc 1 having pre-grooves.

FIG. 8 shows an example of the configuration of a recording device (disc production device) for manufacturing a disc 1 having pre-grooves. A wobbling signal generation circuit 21 has a configuration shown in FIG. 3 and feeds a frequency modulated signal output from the FM modulation circuit 15 to a synthesizing circuit 22. A mark signal generation circuit 23 generates a clock synchronizing mark signal in a predetermined timing and outputs it to the synthesizing circuit 22. The synthesizing circuit 22 synthesizes the frequency modulated signal output by the wobbling signal generation circuit 21 and the clock synchronizing mark signal output by the mark signal generation circuit 23 and outputs the result to a recording circuit 24.

Figure 9:
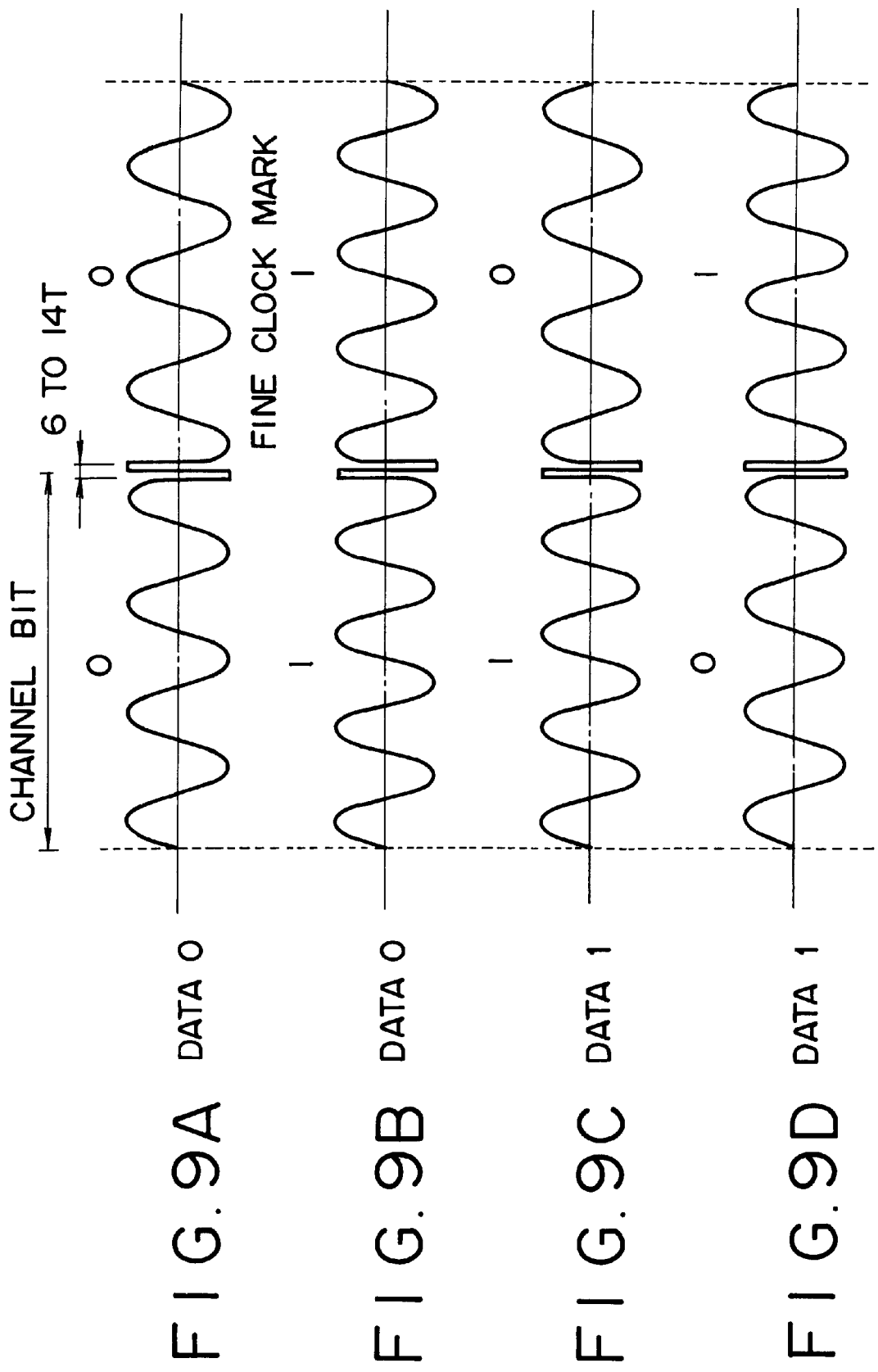
FIGS. 9A to 9D shows the operation of the synthesizing circuit 22 of FIG. 8.

The synthesizing circuit 22, when the clock synchronizing mark signal is fed, synthesizes a clock synchronizing mark (Fine Clock Mark) thereof into a carrier fed from the wobbling signal generation circuit 21, as shown in FIG. 9. If recording/reproducing data is modulated by a process known as eight-to-fourteen-bit modulation (EFM) applied to DVD or the like, the length of clock synchronizing mark is equal to the length of 6 to 14 T (T is the length of bit cell).

Namely, as shown in (a) through (d) in FIG. 9, when channel bit data is 00 (data 0), 11 (data 0), 10 (data 1), or 01 (data 1), a clock synchronizing mark of frequency higher than the modulation frequency (57.6 kHz) of address information is synchronized at the zero-cross point of carrier at the center (channel bit switching point) of each data. The clock synchronizing mark is recorded every data bit or every a predetermined number of data bits.

By thus inserting a clock synchronizing mark at the zero-cross point of a wobbling frequency modulated wave corresponding to the center (channel data bit switching point) of address data bit, the clock synchronizing mark decreases in amplitude variation and the detection thereof is eased.

Namely, in the FM modulation circuit 15, if frequency modulation were carried out in a manner that shifts a frequency by −5%, e.g., from the center frequency when a channel data bit is 0, and by +5% from the center frequency when a channel data bit is 1, the boundary point of data bit or channel data bit and the zero-cross point of frequency modulated wave would not correspond and channel data bits (or data bits) might be erroneously detected. Also, a clock synchronizing mark would be not always inserted at a zero-cross point and be superimposed at a point where the frequency modulated wave has a predetermined amplitude value. As a result, the clock synchronizing mark would increase or decrease in level according to the amplitude value, making the detection thereof difficult. According to this embodiment, because a clock synchronizing mark is always placed at the zero-cross position of frequency modulated wave, the detection, that is, distinction from a frequency modulated wave thereof is eased.

The recording circuit 24 controls an optical head 25 according to a signal fed from the synthesizing circuit 22 and emits a laser beam to form a pre-groove (including clock synchronizing marks) on an original disc 26. A spindle motor 27 is adapted to rotate the original disc 26 at a constant angular velocity (CAV).

Namely, a frequency modulated signal generated by the wobbling signal generation circuit 21 is synthesized with a clock synchronizing mark signal output from the mark signal generation circuit 23 in the synthesizing circuit 22 and is input to the recording circuit 24. The recording circuit 24 controls the optical head 25 according to a signal output from the synthesizing circuit 22 and emits a laser beam. The laser beam emitted from the optical head 25 is irradiated onto the original disc 26 that is being rotated at a constant angular velocity by the spindle motor 27.

The original disc 26 is developed, a stamper is produced therefrom, and a disc 1 is formed from the stamper as a number of replicas. In this way, a phase-change type disc 1, for example, with a pre-groove 2 having clock synchronizing marks described above being formed is obtained.

Figure 10:
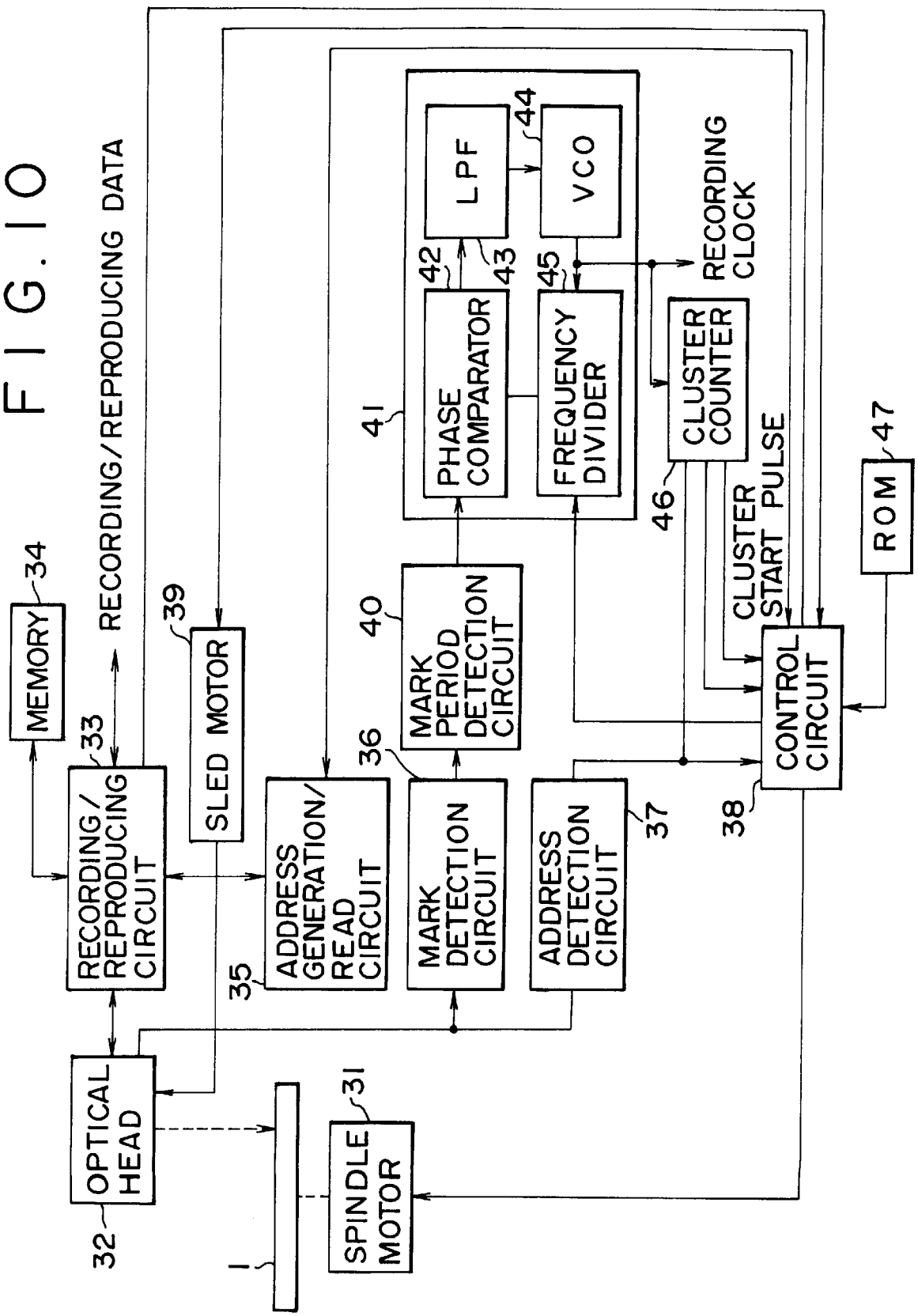
FIG. 10 is a block diagram showing an example of the configuration of an optical disc recording/reproducing device embodying a recording/reproducing device of this invention.

FIG. 10 shows an example of the configuration of an optical disc recording/reproducing device for recording data on the disc 1 obtained in this way, or reproducing data therefrom. A spindle motor 31 is adapted to rotate a disc 1 at a predetermined angular velocity. An optical head 32 irradiates a laser beam onto the disc 1 to record data on the disc 1 and reproduce data from the light reflected by the disc 1. A recording/reproducing circuit 33 temporarily stores recording data input from a device not shown in the figure in memory 34, and when one cluster of data (or one sector of data) as a recording unit has been stored in the memory 34, reads out and modulates it by a predetermined method, and outputs it to the optical head 32. The recording/reproducing circuit 33 demodulates data input from the optical head 32 as required, and outputs it to a device not shown in the figure.

As described later, the recording/reproducing circuit 33 adds a preceding link area and a following link area to recording data and performs output by adding synchronizing signals and recording data to the link areas.

An address generation/read circuit 35 generates a data address (sector address) (described later with reference to FIG. 17) to be recorded in a track (pre-groove 2) according to control by a control circuit 38 and outputs it to the recording/reproducing circuit 33. The recording/reproducing circuit 33 adds the address to recording data fed from a device not shown in the figure and outputs the recording data to the optical head 32. When address data is contained in the reproducing data to be reproduced from a track on the disc 1 by the optical head 32, the recording/reproducing circuit 33 separates it from the reproducing data and outputs it to the address generation/read circuit 35. The address generation/read circuit 35 outputs the read address to a control circuit 38.

A mark detection circuit 36 detects a component corresponding to a clock synchronizing mark from an RF signal output for reproduction by the optical head 32. An address detection circuit 37 reads address information (the track number and segment number in FIG. 2) contained in a wobbling signal from the RF signal output by the optical head 32 and feeds it to a cluster counter 46 and the control circuit 38.

A mark period detection circuit 40 determines the periodicity of a detection pulse output when the mark detection circuit 36 detects a clock synchronizing mark. Namely, because the clock synchronizing mark is generated at a constant period, the mark period detection circuit 40 determines whether the detection pulse input from the mark detection circuit 36 is the one generated at the constant period, and if it is generated at the constant period, generates a pulse synchronously with the detection pulse, and outputs it to a phase comparator 42 of a PLL circuit 41 of a subsequent stage. When the detection pulse is not input at a constant period, the mark period detection circuit 40 generates a dummy pulse at a predetermined timing to prevent the PLL circuit of a subsequent stage from locking an incorrect phase.

In addition to the phase comparator 42, the PLL circuit 41 includes a lowpass filter (LPF) 43, a voltage control oscillator (VCO) 44, and a frequency divider 45. The phase comparator 42 compares the phase of input from the mark period detection circuit 40 and that of input from the frequency divider 45 and outputs the error between the phases. The low-pass filter 43 smoothes a phase error signal output from the phase comparator 42 and outputs the smoothed signal to VCO44. VCO44 generates a clock having a phase corresponding to the output of the lowpass filter 43 and outputs it to the frequency divider 45. The frequency divider 45 frequency-divides the clock input from VCO44 by a predetermined value (value specified in the control circuit 38) and outputs the result to the phase comparator 42.

The clock output by VCO44 is fed to each circuit and the cluster counter 46. The cluster counter 46 counts the number of clocks output by VCO44 on the basis of a track address (track number) fed from the address detection circuit 37, and when the counted value reaches a preset, predetermined value (value corresponding to the length of one cluster), generates a cluster start pulse and outputs it to the control circuit 38.

A sled motor 39 is controlled by the control circuit 38 and is adapted to move the optical head 32 to a predetermined track position. The control circuit 38 controls the spindle motor 31 and rotates the disc 1 at a predetermined constant angular velocity (CAV).

ROM 47 contains a table defining the correspondence between the track numbers (FIG. 2) in address frames and the zones into which a data recording area on the disc 1 is partitioned, and if necessary, a table defining the relationship between the zones and bands associated with the zones.

Figure 11:
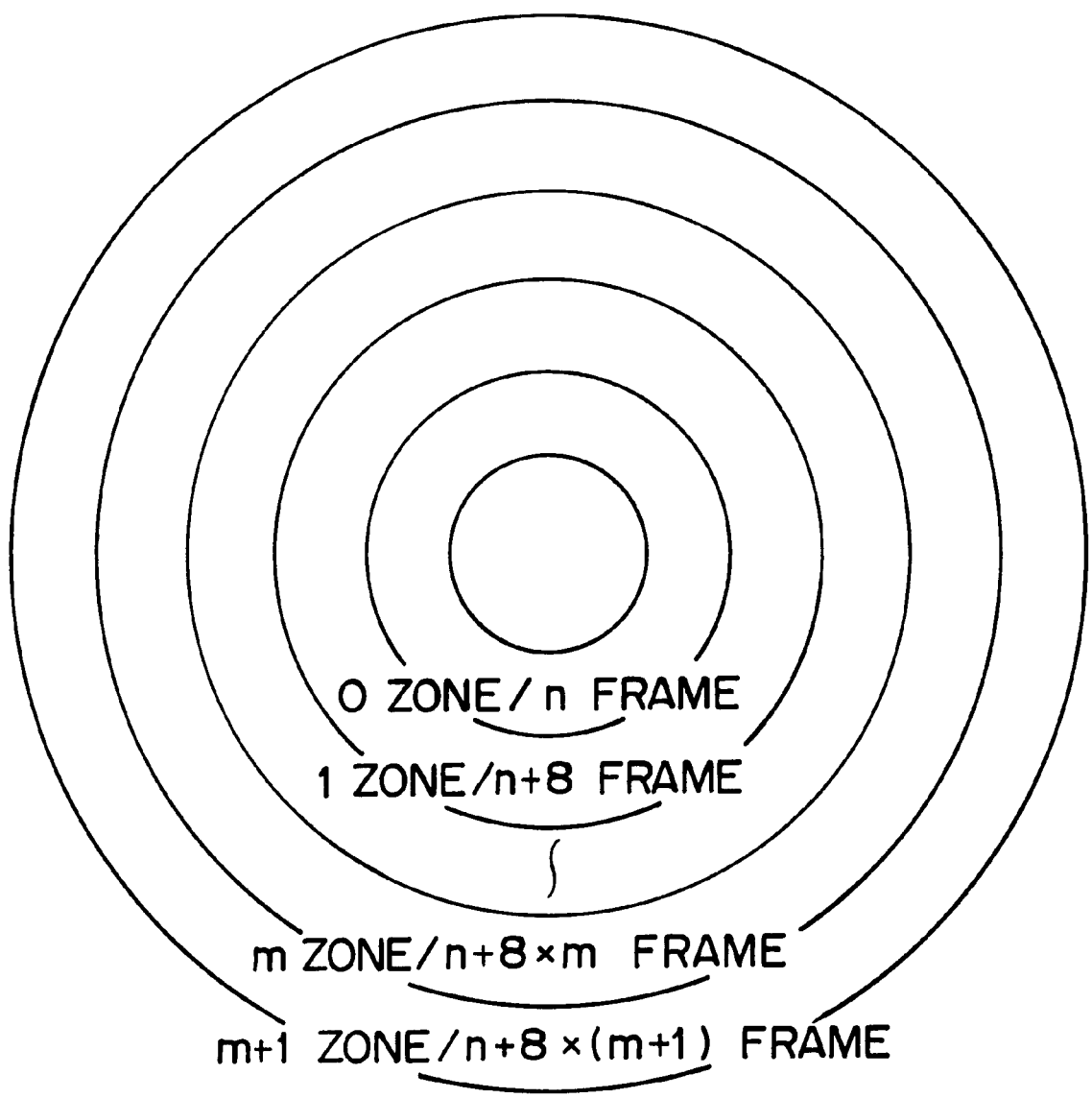
FIG. 11 shows zones in a disc.

Namely, the control circuit 38 partitions the disc 1 into a plurality of zones (in this embodiment, (m+2) number of zones, zone 0 through zone (m+1)) as shown FIG. 11, to record or reproduce data. When the number of data frames (the unit of data transmission blocks unlike address frames described with reference to FIG. 2) per track of zone 0 is n, the number of data frames per track is n+8 in the next zone 1. Hereinafter, in the same way, the number of data frames in a zone on an outer circumferential side is eight greater than that in a zone on an adjacent, inner circumferential side, and the number of data frames in the zone (m+1) on the outermost circumference side is (n+8)×(m+1).

Switching to zone 1 is made at the radius position where the capacity of (n+8) frames is obtained with the same linear density as the innermost circumferential linear density in zone 0. In the same way, zone m begins at the radius position where the capacity of (n+8×m) frames is obtained with the same linear density as the innermost circumferential linear density in zone 0.

For example, in the case of a 120-mm diameter disc 1 on which a recording/reproducing area is allocated in the radius range of 24 mm to 58 mm, if track pitch is 0.83 $\mu$m and linear density is 0.32 $\mu$m/bit, the recording/reproducing area is partitioned into 92 zones as shown in FIGS. 12 to 15. In a zone 0 with a disc radius of 24 mm, 632 frames are allocated per track (one rotation) and 8 frames are increased per track for each increment of zone.

As described later, in this embodiment, because one sector is comprised of 26 frames (data frames), the number (=8) of frames incremented for each zone is set to a value smaller than the number (=26) of frames comprising one sector. This permits forming of more zones in a smaller unit and helps to increase the capacity of disc 1. This method is called zone CLD (Constant Linear Density).

In FIGS. 12 to 15, the data of the columns, from the left in the figures, represents zone number, the radius of the innermost circumference in the zone, the number of frames per track, the number of tracks per zone, the number (cluster count) of recording/reproducing units (blocks) per zone, minimum linear density in the zone, the capacity of the zone, the rotation speed of the zone, the minimum linear velocity of the zone, and the maximum linear velocity of the zone. The rotation speed represents the number of rotations per minute for a data transfer rate of 11.08 Mbps.

In this embodiment, the number of tracks in each zone is fixed to 442 and is equal to the number (the number of frames in ECC block) (described later with reference to FIG. 20) of frames in one recording/reproducing unit.

In this embodiment, the number of tracks in each zone is defined as one time the number (442 frames) of data frames comprising a recording/reproducing unit but can be defined as an integer multiple thereof. This prevents the occurrence of redundant data frames and causes an integer number of recording/reproducing units (blocks) to be placed in each zone, improving zoning efficiency. As a result, a capacity close to that of zone CLV can be obtained.

Such zoning close to CLV reduces a change in clock frequency between a zone and the next zone, and permits extraction of a clock between the zones where the clock frequency changes even in the case of reproduction by a reproducing device designed specifically for CLV, contributing to continuous reproduction between zones.

Next, the operation of the embodiment shown in FIG. 10 will be described. Here, the data recording operation will be described. The optical head 32 irradiates a laser beam onto the optical disc 1 and outputs an RF signal obtained from the reflected light thereof. The address detection circuit 37 reads wobbling information (address information) from the RF signal and outputs the read result to the control circuit 38 and the cluster counter 46. The wobbling information is also input to the mark detection circuit 36, where a clock synchronizing mark is detected and a detection signal thereof is fed to the mark period detection circuit 40.

The mark period detection circuit 40 determines the periodicity of the clock synchronizing mark, generates a predetermined pulse according to the determination result, and outputs it to the PLL circuit 41. The PLL circuit 41 generates a clock (recording clock) synchronously with the pulse and feeds it to the cluster counter 46.

The control circuit 38 can detect the position of a reference clock synchronizing mark in one track (one rotation) from a segment address (segment number) fed from the address detection circuit 37. Access can be made to any position (any position during one rotation) on a track based on the counted value of recording clock on the basis of the first clock synchronizing mark detected in an address frame of segment number 0, for example.

Figure 16:
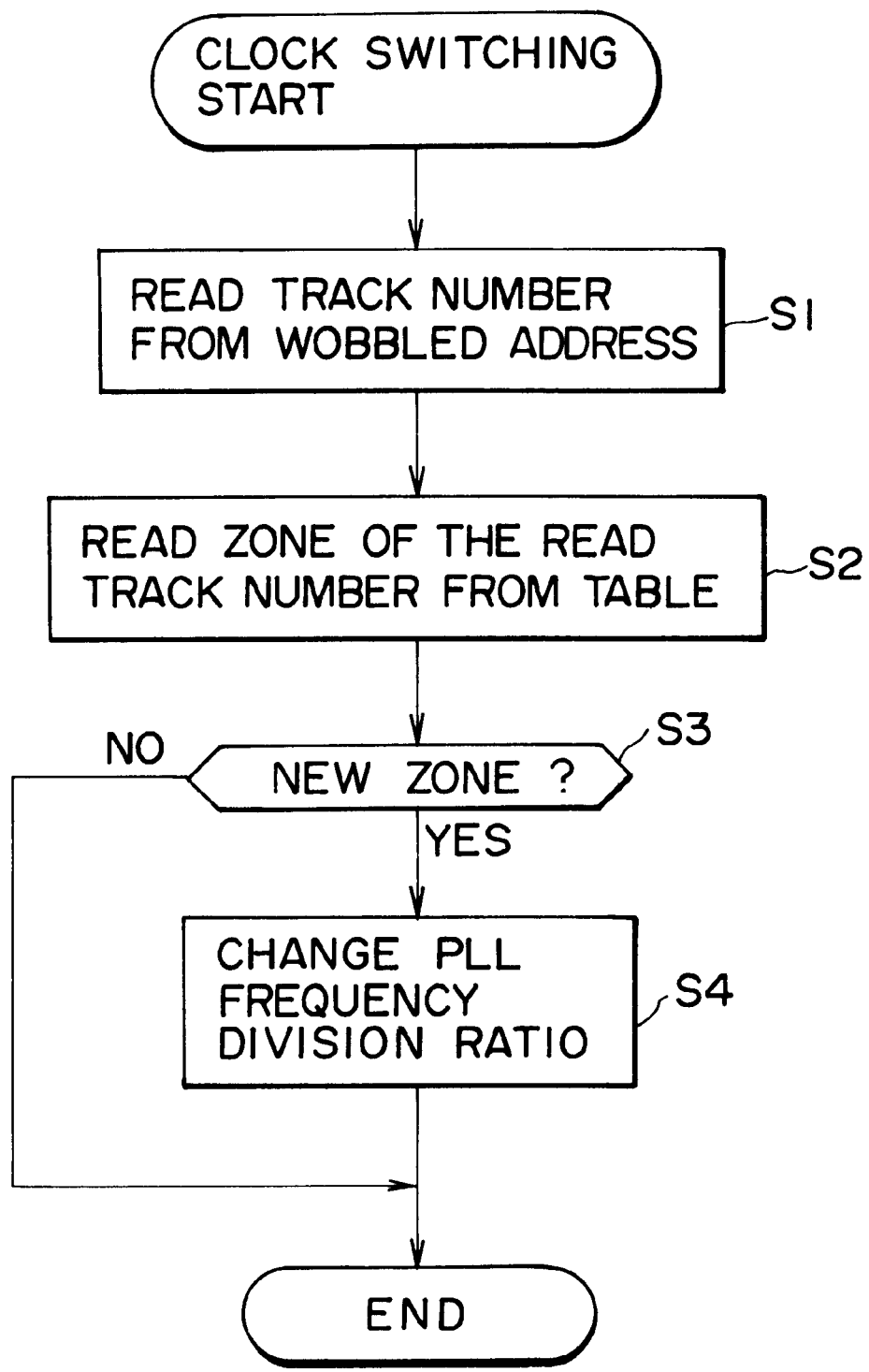
FIG. 16 is a flowchart showing clock switching processing in the embodiment of FIG. 10.

When access has been made to any position on a track in the way described above, it is necessary to determine which zone the access point belongs to and have VCO44 generate a clock having a frequency corresponding to the zone. Accordingly, the control circuit 38 further executes the clock switching processing shown in the flowchart shown in FIG. 16.

Namely, first, in the step S1, the control circuit 38 reads a track number from the address at an access point output by the frame address detection circuit 37. Next, in the step S2, the control circuit 38 reads a zone corresponding to the track number read in the step S1 from the table stored in ROM 47. As described above, the table stored in advance in ROM 47 shows which zone of zones 0 to 92, e.g., a track of each number belongs to.

Accordingly, in the step S3, the control circuit 38 determines whether the track number just read belongs to a new zone different from the zone to which access has been made up to that time. Upon determining it as a new zone, the control circuit 38 goes to the step 4, controls the frequency divider 45, and has it set a frequency dividing ratio corresponding to the new zone. In this way, a recording clock having a different frequency for each zone is output from VCO44.

In the step S3, if a current zone is determined as being not a new zone, the step S4 processing is skipped. Namely, the frequency dividing ratio of the frequency divider 45 is left intact without being changed.

Next, the formatting of recording data by the recording/reproducing circuit 33 will be described. In this embodiment, as described above, data is recorded with one cluster (32 kilobytes) as a unit. The cluster is configured as described below.

Figure 17:
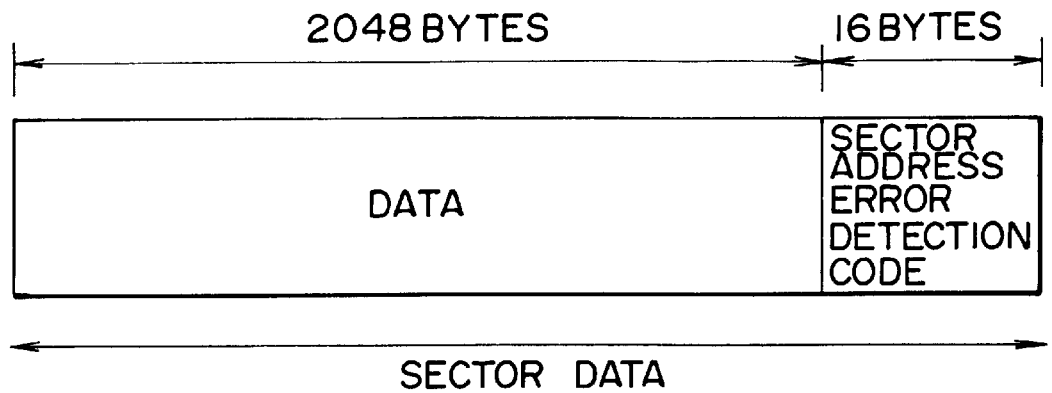
FIG. 17 shows the format of one sector of data.

Namely, 2-kilobyte (2,048 bytes) data is extracted as one sector of data from among data stored in the memory 34 and in the recording/reproducing circuit 33, a 16-byte overhead is appended thereto, as shown in FIG. 17. The overhead contains a sector address (address generated or read by the address generation/read circuit 35) and an error detection code for error detection.

Figure 18:
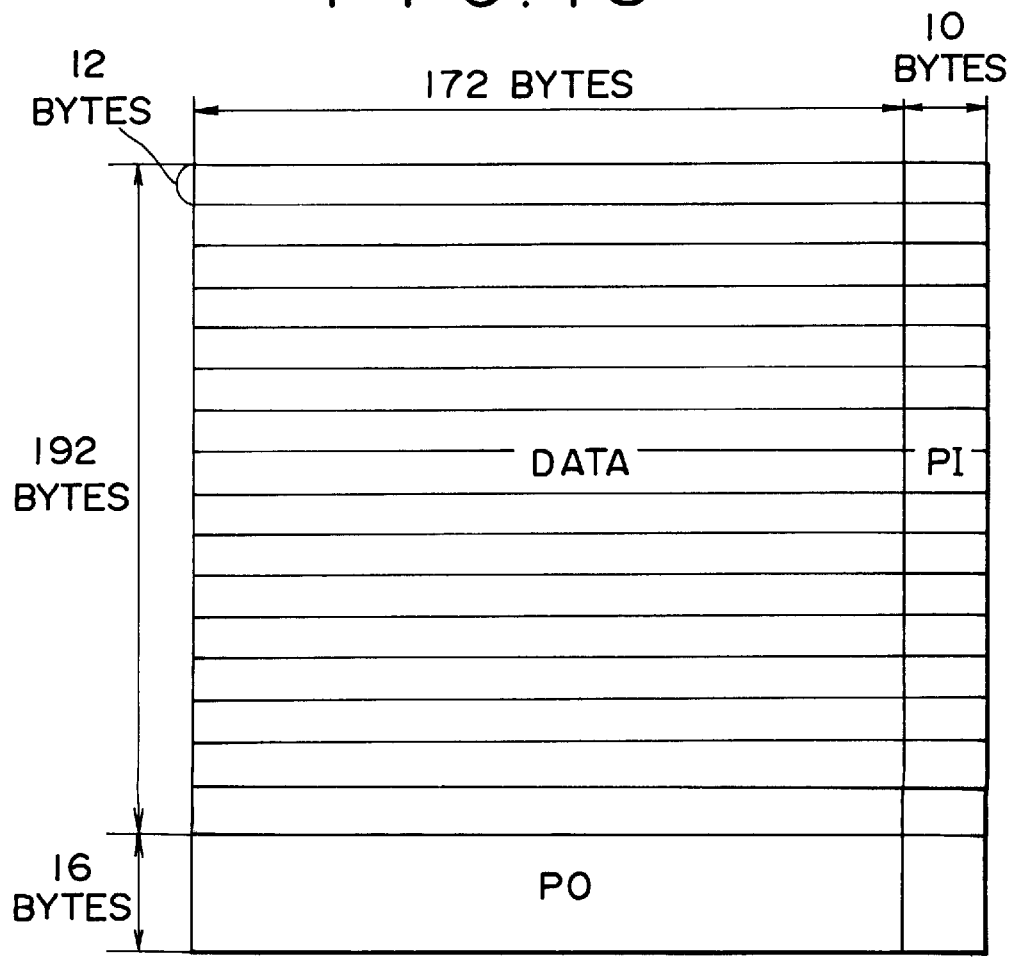
FIG. 18 shows the structure of 32K-byte data.

In the recording/reproducing circuit 33, a total of 2,064 (=2,048+16) bytes of data is defined as 12×172 (=2,064) bytes of data as shown in FIG. 18. Sixteen segments with one cluster of data as one segment constitute 192 (=12×16)× 172 bytes of data. For the 192×172 bytes of data, a 10-byte inside code (PI) and a 16-byte outside code (PO) are appended as parity for error correction to each of bytes in horizontal and vertical directions, respectively.

Of the data blocked to 208 (=192+16)×182 (=172+10) bytes, 16×182 bytes of outside code (PO) are partitioned into 16 pieces of 1×182 bytes of data, each being appended and interleaved below each of 16 pieces of 12×182 bytes of sector data numbered 0 to 15 as shown in FIG. 19. Thus, 13 (=12+1)×182 bytes of data are defined as data of one sector.

Figure 20:
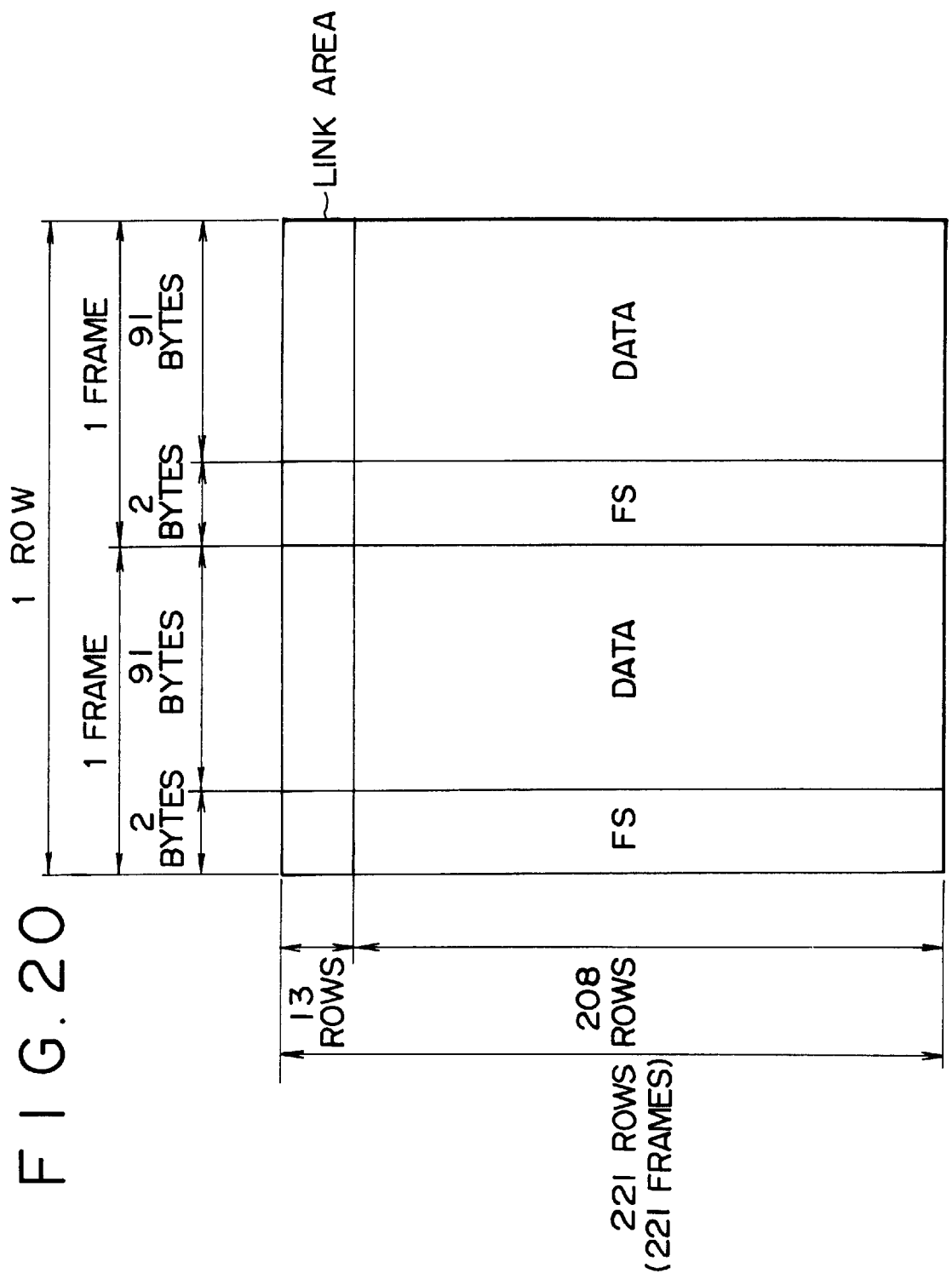
FIG. 20 shows the configuration of 32K-byte block data.

Further, 208×182 bytes of data are vertically halved as shown in FIG. 20, resulting in data of 208×2 frames, each 91 bytes long. The data of 208×2 frames is preceded by link data (data in a link area) of 13×2 frames (more correctly, as described later with reference to FIG. 25, part of 26 frames of data is recorded at the end of cluster and the rest is recorded at the start of current cluster).

Further, 2-bytes frame synchronizing signal (FS) is appended at the start of 91 bytes of frame data. As a result, as shown in FIG. 20, with one frame of data being comprised of 93 (=91+2) bytes, a data block having 221 (=208+13)× (93×2) bytes, which is equivalent to 442 frames, is formed. Data of the IECC block constitutes a clusterful of data (block as a recording unit). The size of actual data portion except the overhead portion is 32K bytes (=2,048×16/1024 K bytes).

Namely, in this embodiment, one cluster is composed of 16 sectors and one sector is composed of 26 frames.

Figure 22:
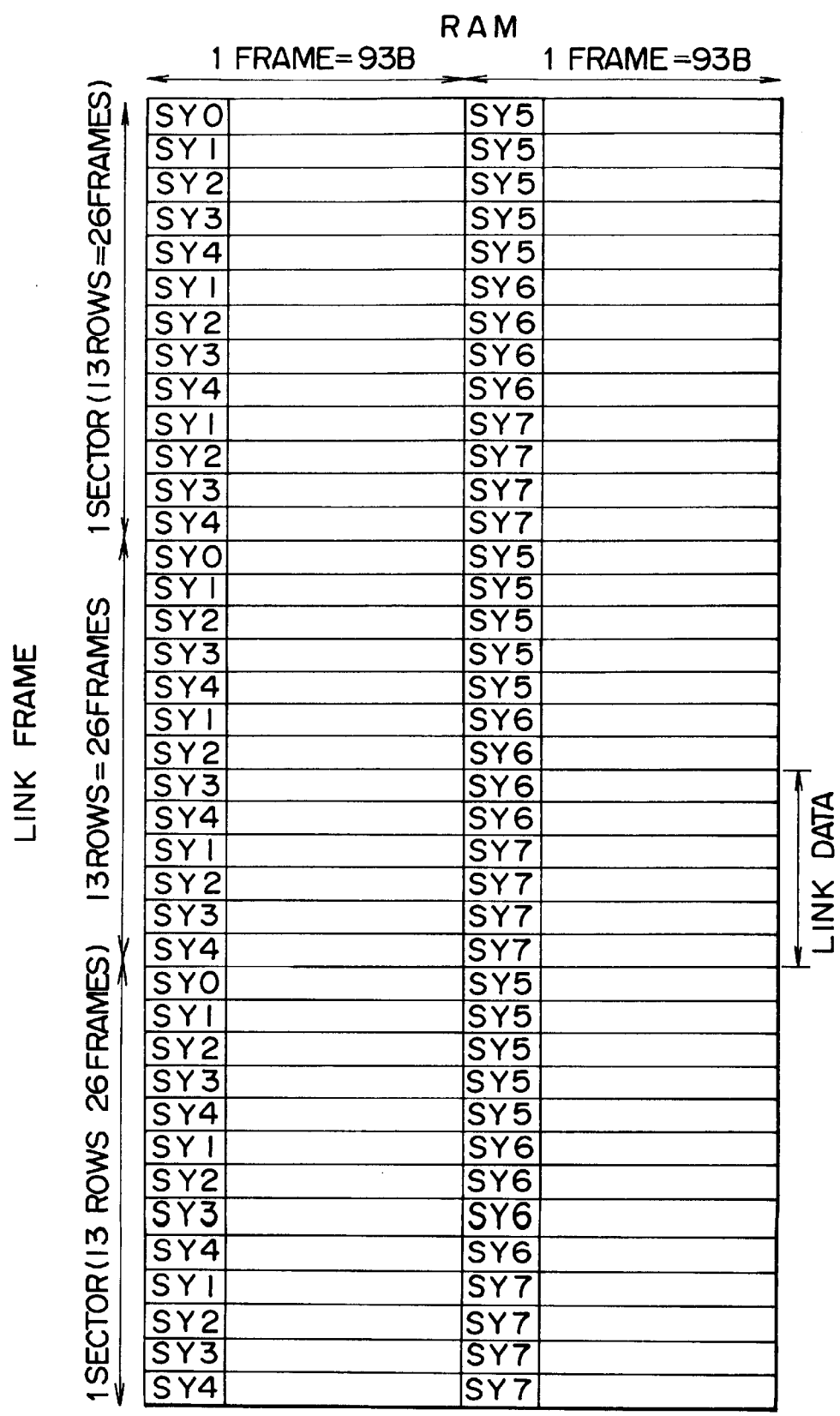
FIG. 22 shows an example of the configuration of frames and frame synchronizing signals of a RAM disc.

FIGS. 21 and 22 show the configuration of frames and frame synchronizing signals in the link section between a cluster and the next cluster of ROM disc (reproduce only disc) and RAM disc (rewritable disc), respectively. In the ROM disc, a cluster and the next cluster are directly linked (linked with no link frame intervening between them). One sector is comprised of 13 lines of data or 26 frames, each frame being preceded by one of frame synchronizing signals SY0 to SY7.

In the RAM disc, a link area is provided between a cluster and the next cluster. The last 13 rows of data, that is, 26 frames (one sector) of data in a cluster are followed by a link area comprising 26 frames (one sector), followed by the first 26 frames (one sector) of data in the next cluster. Frame synchronizing signals in clusters of the RAM disc and those in clusters of the ROM disc are identical in structure. Further, frame synchronizing signals in a link area of the RAM disc have the same structure as those in clusters. That is, frame synchronizing signals have an identical pattern whether a cluster, a link area, a ROM disc, or a RAM disc. Such a structure permits easy reproduction of RAM discs by reproduction devices designed specifically for ROM discs.

Namely, because a reproduction device designed specifically for ROM discs is adapted so that, when eight frame synchronizing signals SY1, SY7, SY2, SY7, SY3, SY7, SY4, and SY7 stored in tenth to thirteenth lines of a data block are detected, it recognizes that the next data is the start of the data block, it is possible to have the reproduction device recognize the start of a data area following a link area by storing the eight frame synchronizing signals in the link area.

In ROM discs and RAM discs, data is recorded in the areas indicated by the blank portions in the figure. In a link area of RAM disc, postamble data, post guard data, slice/PLL data, etc. are recorded in the blank portions on the first seven rows (14 frames), and the next six rows (12 frames) are defined as a link data area, in the blank portions of which data is recorded as in a cluster.

Figure 23:
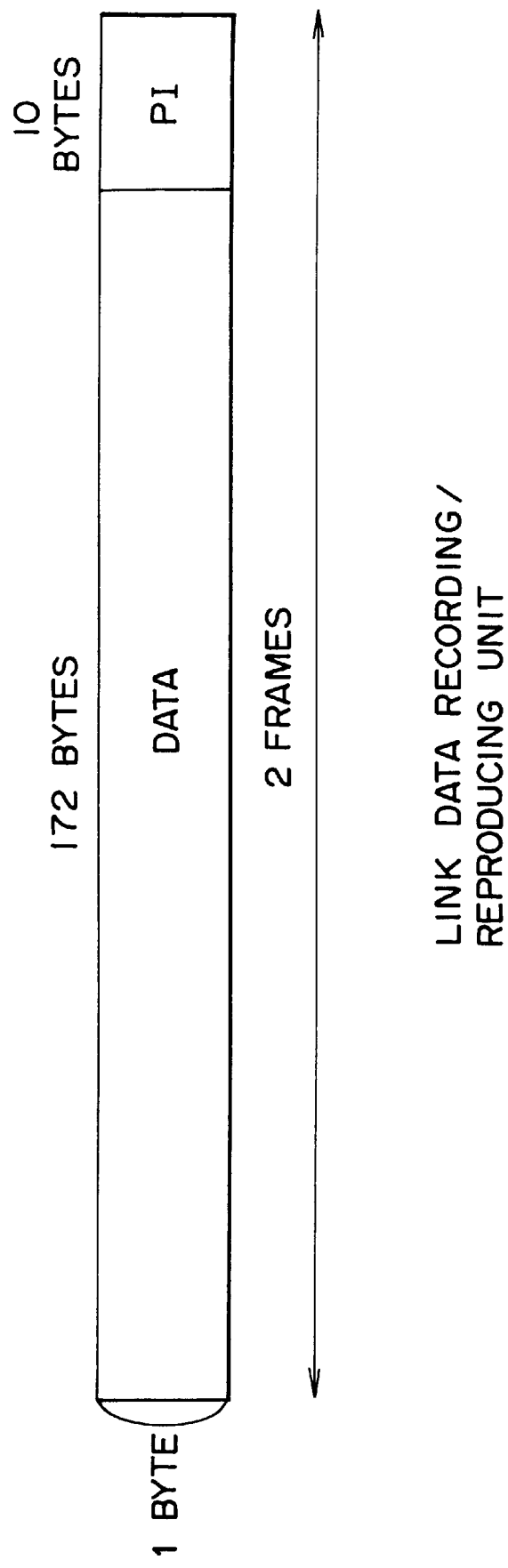
FIG. 23 show the format of recording/reproducing unit of link data.

FIG. 23 shows an example of the structure of a recording/reproducing unit of two frames in a link data area within a link frame. As shown in the figure, the recording/ reproducing unit is comprised of two frames with a 10-byte inside code (PI) appended to 172 bytes of data. Namely, this unit has the same structure as that of one row in the ECC block shown in FIG. 19. Because the use of PI type alone will provide poorer error correction capability than would be achieved in ECC blocks, in this embodiment, identical data of a structure shown in FIG. 23 is recorded repeatedly six times in the six-row link data area shown in FIG. 22.

FIG. 24 shows an example of frame synchronizing signals SY0 to SY7 shown in FIGS. 21 and 22. Although the frame synchronizing signals are defined as 2-byte data, in this embodiment, the data length of each frame synchronizing signal is 32 bits (4 bytes) since data converted into channel bit data is used. SY0, e.g., has four types of states, states 1 to 4, and when SY0 is appended to 91-byte frame data (see FIG. 20), the data of a state in which DSV (Digital Sum Value) is minimized is selected and appended as a frame synchronizing signal by the recording/reproducing circuit 33.

Figure 25:
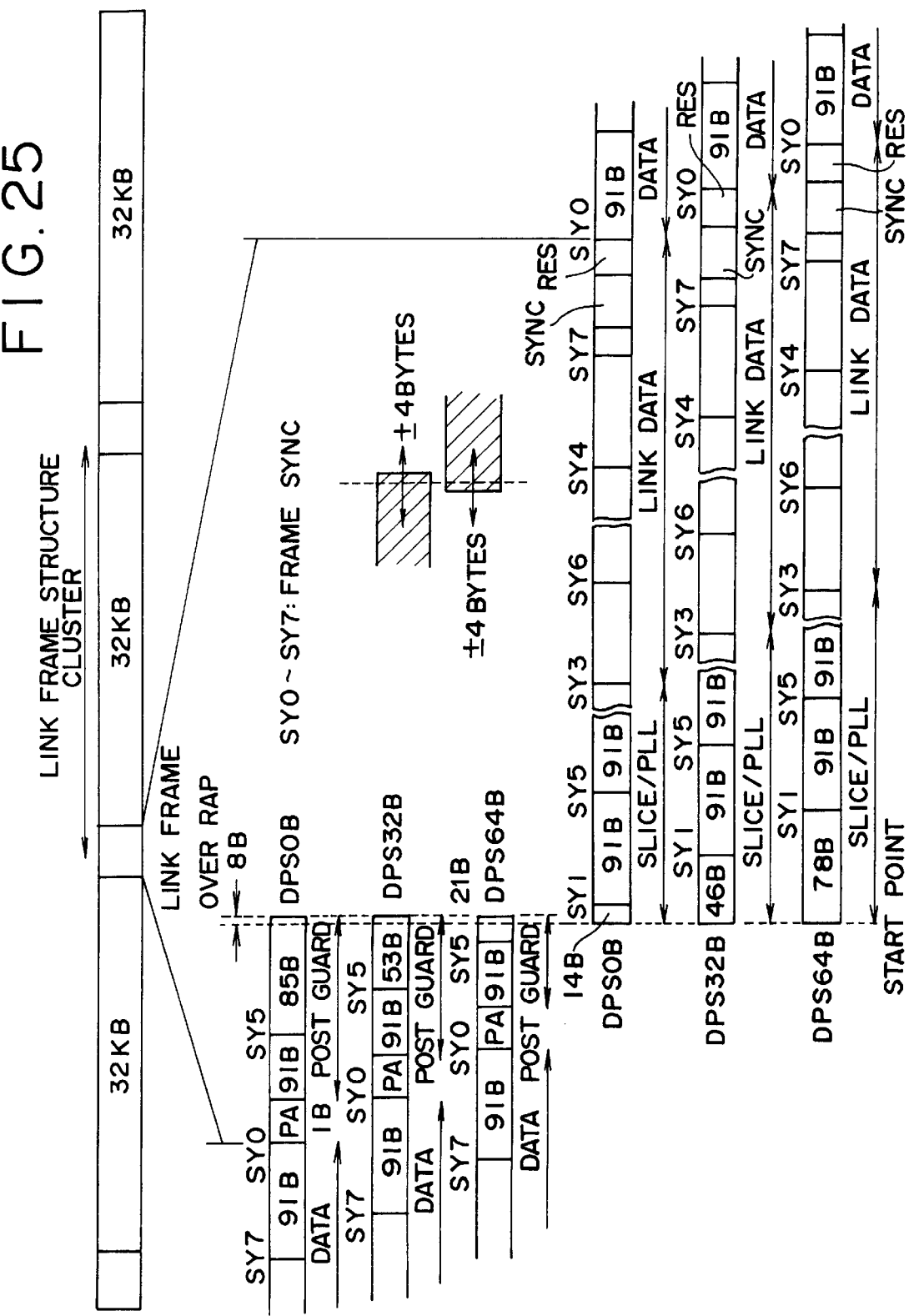
FIG. 25 shows an example of the structure of a link area.

FIG. 25 shows a more detailed format of a link area between a cluster and a cluster.

As shown in FIG. 25, a link area (link frame) is composed of 26 frames (one sector) and inserted between a 32K-byte data block (cluster) and the next 32K-byte data block (cluster). Slice/PLL data and link data are recorded in a link area preceding a 32K-byte data block, while postamble (PA) and post guard are recorded in the link area following a 32K-byte data block.

Slice is data for setting a time constant used to convert reproducing data into binary values and PLL is data used to reproduce a clock. Link data is substantially the same as data recorded in clusters. The frame synchronizing signals SY1 to SY7 are appended with one of states 1 to 4 being selected, as described above with reference to FIG. 24.

In postamble, data for adjusting the mark length of last data and restoring signal polarity is recorded. Post guard is an area for absorbing recording jitter generated according to disc eccentric, disc recording sensitivity, etc. Post guard also prevents mutual data interference with a link area for the next recording even when the start position of data recording is changed, as described later. Post guard is recorded in overlap with eight bytes of the next data when there is no jitter at all and DPS (Data Position Shift) described later is 0 byte.

A synchronizing signal (sync) is 4-byte data and is a signal for synchronization. The last 4 bytes of software is a reserved area (res) for future use.

Recording in each cluster is started from a start point and terminated at a point eight bytes beyond the start point. In the case of recording, the recording/reproducing circuit 33 selects a value from 0 to 64 bytes at random as DPS data and changes the recording position of link area data and 32K-byte block data according to the selected DPS data value.

As shown in a magnified portion of FIG. 25, for example, when 0 byte is selected as DPS data, 14-byte slice/PLL data is appended before the first frame synchronizing signal SY1 of a preceding link area and 85-byte post guard data is appended after the last frame synchronizing signal SY5 of a following link area.

When 32 bytes are selected as DPS data, 46-byte slice/ PLL data is appended before the first frame synchronizing signal SY1 of a preceding link area and 53-byte post guard data is appended after the last frame synchronizing signal SY5 of a following link area.

Further, when 64 bytes are selected as DPS data, 78-byte slice/PLL data is appended before the first frame synchronizing signal SY1 of a preceding link area and 21-byte post guard data is appended after the last frame synchronizing signal SY5 of a following link area.

Thus, the position in which data is recorded in a link area and a cluster changes according to a DPS data value selected by the recording/reproducing circuit 33. Accordingly, when information is recorded on a phase-change type disc, it is possible to prevent repeated recording of identical data (e.g., frame synchronizing signals, etc.) in the same portion on the disc. In this case, because a start point is fixed, the generation of recording timing can be implemented in the same way as before.

In the embodiment described above, the length (bytes) of each area is an example and can be set to a predetermined value.

This invention will produce especially good results when applied to phase-change type discs.

What is claimed is:

1. A disc in which data is recorded along tracks, said disc comprising:
a plurality of data blocks of a first size, each having a plurality of sectors of a second size, being formed on said tracks; and
link areas of said second size formed between respective data blocks; wherein
each link area includes a start point as a recording start position and a pre-specified random amount of position shift data following said start point.

2. A disc as claimed in claim 1, wherein said first size is a unit for recording or reproducing data.

3. A disc as claimed in claim 1, wherein said data blocks have first and second error correction blocks comprised of first and second error correction code types.

4. A disc in which data is recorded along tracks, said disc comprising
a plurality of data blocks of a first size, each having a plurality of sector data of a second size being formed on said tracks; and
link areas of said second size formed between respective data blocks; wherein
said track is comprised of at least one wobbling groove modulated corresponding to address information including a track number and a segment number designating a circumferential direction.

5. A disc in which data is recorded along tracks, said disc comprising:
a plurality of data blocks of a first size, each having a plurality of sectors of a second size being formed on said tracks; and
link areas of said second size formed between respective data blocks; wherein
each of said sectors comprises a plurality of frames having frame synchronization signals which are selected from among frame synchronization signals of plural types and are disposed in a specified order, and each of said link areas includes frames disposed in such an order that frame synchronization signals thereof are equal to said frame synchronization signals of said sectors.

6. A disc in which data is recorded along tracks, wherein:
said disc has the same frame structure as a reproduce only disc in which sectors of data are comprised of a plurality of frames having respective specified frame synchronization signals; and
a link area is formed between adjacent sectors, said area including frames disposed in such an order that frame synchronization signals thereof are equal to said frame synchronization signals of said sectors.

7. A device for recording data in a disc, said device comprising:

a head for recording data on tracks formed in said disc and reproducing the data recorded on the tracks; and a recording circuit for outputting input data to said head in units of data blocks having a first size and adding a portion of link areas having a second size before and after the data blocks for output; wherein each link area includes a start point as a recording start position and a pre-specified random amount of position shift data following said start point.

8. A device as claimed in claim 7, wherein said data block consists of a plurality of sectors having said second size, further comprising an address generation circuit for generating sector addresses to be added to these sectors.

9. A device as claimed in claim 7, wherein said link areas comprise a front link area added after the preceding data block and a rear link area added to the following data block.

10. A device as claimed in claim 7, wherein said recording circuit adds first and second error correction codes comprised of first and second error correction code types to said data blocks.

11. A device for recording data in a recordable disc having the same frame structure as a reproduce-only disc in which sectors of data are comprised of a plurality of frames having respective specified frame synchronization signals, said device comprising:

a head for recording data on tracks formed in said disc and reproducing the data recorded on the tracks; and a recording circuit for outputting input data to said head in units of data sectors and adding link data between the adjacent data sectors, said link data having frames disposed in such an order that frame synchronization signals thereof are equal to said frame synchronization signals of said data sectors.

* * * * *